US012771181B2

(12) United States Patent
Tachiwa

(10) Patent No.: US 12,771,181 B2
(45) Date of Patent: Oct. 20, 2026

(54) POWER TRANSMISSION APPARATUS, POWER RECEPTION APPARATUS, AND METHOD

(71) Applicant: CANON KABUSHIKI KAISHA, Tokyo (JP)

(72) Inventor: Wataru Tachiwa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 252 days.

(21) Appl. No.: 18/617,030

(22) Filed: Mar. 26, 2024

(65) Prior Publication Data

US 2024/0235281 A1 Jul. 11, 2024

Related U.S. Application Data

(63) Continuation of application No. PCT/JP2022/035396, filed on Sep. 22, 2022.

(30) Foreign Application Priority Data

Sep. 27, 2021 (JP) ................................ 2021-156854

(51) Int. Cl.

*H02J 50/80* (2016.01)
*H02J 50/10* (2016.01)
*H02J 7/80* (2026.01)
*H04W 4/80* (2018.01)

(52) U.S. Cl.

CPC .............. *H02J 50/80* (2016.02); *H02J 50/10* (2016.02); *H02J 7/80* (2026.01); *H04W 4/80* (2018.02)

(58) Field of Classification Search

CPC .............. H02J 50/80; H02J 50/10; H02J 7/80; H04W 4/80
USPC .......................................................... 307/104
See application file for complete search history.

(56) References Cited

U.S. PATENT DOCUMENTS

| | | | | |
|---|---|---|---|---|
| 9,667,102 | B2 * | 5/2017 | Takahashi | H02J 50/60 |
| 9,722,452 | B2 * | 8/2017 | Schroeder | H02J 7/80 |
| 2017/0093212 | A1 * | 3/2017 | Nagamine | H02J 50/10 |
| 2018/0342907 | A1 * | 11/2018 | Dimke | H02J 50/60 |
| 2020/0381958 | A1 * | 12/2020 | Wu | H02J 50/80 |

FOREIGN PATENT DOCUMENTS

| | | | |
|---|---|---|---|
| EP | 3852234 | A1 | 7/2021 |
| JP | 2016007116 | A | 1/2016 |
| JP | 2018108014 | A | 7/2018 |
| JP | 2018163077 | A | 10/2018 |
| JP | 2019187070 | A | 10/2019 |

* cited by examiner

*Primary Examiner* — Alfonso Perez Borroto
(74) *Attorney, Agent, or Firm* — Canon U.S.A., Inc. IP Division

(57) ABSTRACT

A power reception apparatus wirelessly receives power from a power transmission apparatus via a first antenna, communicates with the power transmission apparatus via a second antenna, using a communication packet capable of storing a plurality of control packets that controls wireless power transmission. And The power reception apparatus limits the number of control packets of a specific type to be stored in the communication packet to one or less and does not limit the number of control packets of a type different from the specific type to be stored in the communication packet to one or less.

11 Claims, 14 Drawing Sheets

POWER TRANSMISSION APPARATUS, POWER RECEPTION APPARATUS, AND METHOD

CROSS-REFERENCE TO RELATED APPLICATIONS

This application is a Continuation of International Patent Application No. PCT/JP2022/035396, filed Sep. 22, 2022, which claims the benefit of Japanese Patent Application No. 2021-156854, filed Sep. 27, 2021, both of which are hereby incorporated by reference herein in their entireties.

BACKGROUND

Field

The present disclosure relates to a wireless power transmission technique.

Background Art

In recent years, a technique for a wireless power transmission system has been widely developed. Patent literature 1 discusses a power transmission apparatus and a power reception apparatus compliant with a standard formulated by a standards body called the Wireless Power Consortium (WPC) (hereinafter referred to as the "WPC standard"). The transmission power of wirelessly transmitted power changes according to the state of the power reception apparatus or the positional relationship between the power transmission apparatus and the power reception apparatus. In the WPC standard, the power reception apparatus transmits a control error (hereinafter referred to as "CE") packet to the power transmission apparatus, and the power transmission apparatus adjusts the transmission power based on the CE packet. The power reception apparatus transmits the CE packet at a timing determined in advance, whereby the power transmission apparatus can control the transmission power almost in real time.

On the other hand, patent literature 2 discusses a communication method in which a power transmission apparatus or a power reception apparatus performs communication using a frequency different from a frequency used in wireless power transmission via an antenna different from an antenna used in the wireless power transmission. Patent literature 2 cites Bluetooth (registered trademark) Low Energy (hereinafter referred to as "BLE") communication as an example of the communication method. In the BLE communication, more information can be transmitted at high speed than in a case where communication using the same frequency as a frequency used in wireless power transmission via an antenna used in the wireless power transmission is used.

Patent literature 1 does not specifically discuss how to transmit and receive a packet that should be immediately used in controlling of wireless power transmission, such as a CE packet, in BLE communication used in wireless power transmission.

BLE communication is a communication method for intermittently performing communication every predetermined time, and there is a constraint on the time in which communication can be performed. Thus, it is possible that communication is performed by including a plurality of packets defined by the WPC standard in a packet used in the BLE communication. However, for example, in a case where the power reception apparatus transmits one packet used in the BLE communication by including a plurality of CE packets in the one packet, the power transmission apparatus having received the packet may not be able to appropriately control the transmission power. It is considered that this issue occurs not only in the BLE communication but also in another communication method in a similar manner.

CITATION LIST

Patent Literature

PTL 1: Japanese Patent Laid-Open No. 2016-007116
PTL 2: Japanese Patent Laid-Open No. 2019-187070

SUMMARY

The present disclosure is directed to providing a technique for, in a case where communication for controlling of wireless power transmission is performed using an antenna different from an antenna used in the wireless power transmission, appropriately controlling the wireless power transmission.

A power reception apparatus according to an aspect of the present disclosure wirelessly receives power from a power transmission apparatus via a first antenna, communicates with the power transmission apparatus via a second antenna, using a communication packet capable of storing a plurality of control packets that controls wireless power transmission. And the power reception apparatus limits the number of control packets of a specific type to be stored in the communication packet to one or less and does not limit the number of control packets of a type different from the specific type to be stored in the communication packet to one or less.

Further features of the present disclosure will become apparent from the following description of exemplary embodiments with reference to the attached drawings.

DESCRIPTION OF THE EMBODIMENTS

First Exemplary Embodiment

Exemplary embodiments of the present disclosure will be described below with reference to the drawings. The following exemplary embodiments are merely examples for describing the technical idea of the present disclosure, and are not intended to limit the present disclosure to configurations and methods described in the exemplary embodiments. Although a plurality of features is described in the exemplary embodiments, not all the plurality of features is essential for the present disclosure, and the plurality of features may be optionally combined together. Further, in the attached drawings, the same or similar components are designated by the same reference numbers.

Configuration of System

Figure 1:
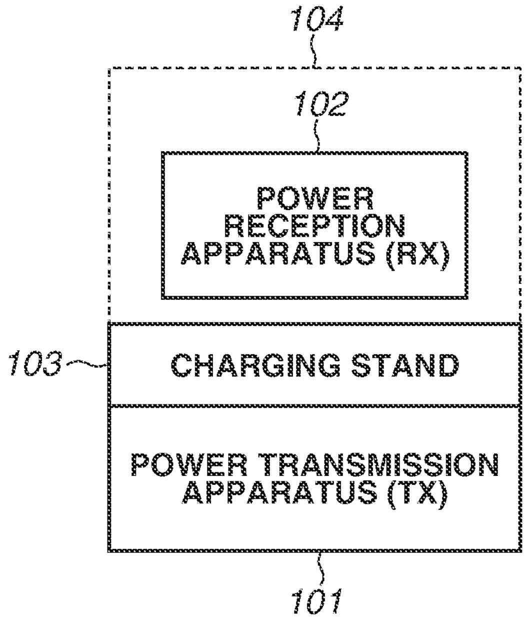
FIG. 1 is a diagram illustrating a configuration of a wireless power transmission system.

FIG. 1 illustrates an example of the configuration of a wireless power transmission system according to the present exemplary embodiment. As an example, this system includes a power transmission apparatus 101 and a power reception apparatus 102. Hereinafter, the power transmission apparatus 101 will occasionally be referred to as a "TX", and the power reception apparatus 102 will occasionally be referred to as an "RX". The RX 102 is an electronic device that receives power from the TX 101 and charges a built-in battery. The TX 101 is an electronic device that wirelessly transmits power to the RX 102 placed on a charging stand 103. Each of the RX 102 and the TX 101 can have the function of executing an application other than a wireless charging application. An example of the RX 102 is a smartphone, and an example of the power transmission apparatus 101 is an accessory device for charging the smartphone. Each of the RX 102 and the TX 101 may be a tablet or a storage device such as a hard disk device or a memory device, or may be an information processing apparatus such as a personal computer (PC). Alternatively, each of the RX 102 and the TX 101 may be an imaging apparatus (a camera or a video camera), an automobile, a robot, a medical device, or a printer. Yet alternatively, the RX 102 may be an electric automobile. Yet alternatively, the TX 101 may be a charger installed in a console in an automobile, or may be a charging apparatus that charges an electric automobile. The RX 102 may not need to have a battery built-in.

Each of the RX 102 and the TX 101 has a communication function using Bluetooth (registered trademark) Low Energy (BLE). Specifically, the RX 102 and the TX 101 perform communication based on the Bluetooth 4.0 standard or later. The detailed configurations of the TX 101 and the RX 102 will be described below with reference to FIGS. 2 and 3. Hereinafter, a standard defined regarding BLE in Bluetooth 4.0 or later will be referred to as the "BLE standard". BLE is an intermittent communication method. The intermittent communication method refers to a communication method for repeating an intermittent operation of intermittently driving (starting) a communication unit (a control integrated circuit (IC) for BLE communication), performing communication only during the driving, and powering off the communication unit (the control IC for the BLE communication) or bringing the communication unit (the control IC for the BLE communication) into a low power consumption state during a period other than that of the communication. This achieves a reduction in power consumption. Alternatively, each of the RX 102 and the TX 101 may have a communication function compliant with the Zigbee (registered trademark) standard. That is, in the present disclosure, communication compliant with Zigbee instead of BLE may be used. Further, the RX 102 and the TX 101 may be compatible with another communication method and perform communication.

This system performs wireless power transmission using an electromagnetic induction method for wireless power transmission based on the Wireless Power Consortium (WPC) standard defined by the WPC. That is, the TX 101 and the RX 102 perform wireless power transmission for wireless power transmission based on the WPC standard between a power transmission coil of the TX 101 and a power reception coil of the RX 102. The wireless power transmission method is not limited to a method defined by the WPC standard, and may be another electromagnetic induction method, a magnetic field resonance method, an electric field resonance method, a microwave method, or a method using a laser. Although the wireless power transmission is used for contactless charging in the present exemplary embodiment, the wireless power transmission may be performed for use other than contactless charging.

In the WPC standard, the magnitude of power guaranteed to be output from the power reception apparatus to a load (e.g., a circuit for charging and a battery) is defined by a value called guaranteed power (hereinafter referred to as "GP"). For example, the GP indicates the power value of the power guaranteed to be output to the load (e.g., the circuit for charging and the battery) in the power reception apparatus even if the positional relationship between the power reception apparatus and the power transmission apparatus changes and the power transmission efficiency between a power reception antenna 205 and a power transmission antenna 105 decreases. For example, in a case where the GP is 5 watts, and even if the positional relationship between the power reception antenna and the power transmission antenna changes and the power transmission efficiency decreases, the power transmission apparatus transmits power by performing control so that 5 watts can be output to the load in the power reception apparatus. The GP is determined by a negotiation made by the power transmission apparatus and the power reception apparatus. The present exemplary embodiment is applicable to a configuration in which power is transmitted and received based on not only the GP but also power determined by the power transmission apparatus and the power reception apparatus negotiating with each other.

The TX 101 and the RX 102 according to the present exemplary embodiment perform communication for power transmission control based on the WPC standard. The WPC standard defines a plurality of phases including the power transfer phase where power is transmitted, and phases before the power is actually transmitted, and communication for power transmission control required in each phase is performed. The phases before the power is transmitted include the selection phase, the ping phase, the identification and configuration phase, the negotiation phase, and the calibration phase. Hereinafter, the identification and configuration phase will be referred to as the "I & C phase".

In the selection phase, the power transmission apparatus intermittently transmits an analog ping and detects that an object is placed on the power transmission apparatus (e.g., the power reception apparatus or a conductor piece is placed on the charging stand). The power transmission apparatus detects at least either one of the voltage value and the current value of the power transmission antenna 105 when the analog ping is transmitted. If the voltage value falls below a certain threshold, or if the current value exceeds a certain threshold, the power transmission apparatus determines that an object is present. Then, the power transmission apparatus transitions to the ping phase.

In the ping phase, the power transmission apparatus transmits a digital ping having power greater than that of the analog ping. The magnitude of the power of the digital ping is sufficient power for a control unit of the power reception apparatus placed on the power transmission apparatus to start. That is, the digital ping is power transmitted from the power transmission apparatus to start the power reception apparatus. The power reception apparatus notifies the power transmission apparatus of the magnitude of a power reception voltage. This notification is given using a signal strength packet defined by the WPC standard. As described above, the power transmission apparatus receives a response from the power reception apparatus having received the digital ping, thereby recognizing that the object detected in the selection phase is the power reception apparatus. If the power transmission apparatus receives the notification of the power reception voltage value, the power transmission apparatus transitions to the I & C phase. The power transmission apparatus measures the Q factor of the power transmission antenna 105 before transmitting the digital ping. The result of this measurement is used to execute a foreign object detection process using a Q factor measurement method. For example, the foreign object according to the present disclosure is a clip or an IC card. Among objects in indispensable portions of the power reception apparatus and a product in which the power reception apparatus is incorporated or the power transmission apparatus and a product in which the power transmission apparatus is incorporated, an object that may generate unintended heat in a case where the object is exposed to wireless power transmitted from the power transmission antenna does not correspond to the foreign object.

In the I & C phase, the power transmission apparatus identifies the power reception apparatus and acquires device configuration information (capability information) from the power reception apparatus. The power reception apparatus transmits an identification (ID) packet and a configuration packet. The ID packet includes identifier information regarding the power reception apparatus, and the configuration packet includes device configuration information (capability information) regarding the power reception apparatus. The power transmission apparatus having received the ID packet and the configuration packet responds with an acknowledgement (ACK, a positive response). Then, the I & C phase ends.

In the negotiation phase, based on the value of the GP requested by the power reception apparatus and the power transmission capability of the power transmission apparatus, the value of the GP is determined. According to a request from the power reception apparatus, the power transmission apparatus also executes a foreign object detection process using a Q factor measurement method. The WPC standard defines a method for temporarily transitioning to the power transfer phase and then performing processes similar to those in the negotiation phase again according to a request from the power reception apparatus. The phase to which the power transfer phase transitions and in which these processes are performed is referred to as the "renegotiation phase".

In the calibration phase, calibration is performed based on the WPC standard. The power reception apparatus notifies the power transmission apparatus of predetermined reception power values (a reception power value in a light load state and a reception power value in a maximum load state) and the power transmission apparatus makes adjustments to efficiently transmit power. The reception power values the power transmission apparatus is notified of can be used for a foreign object detection process based on a power loss technique.

In the power transfer phase, control for starting and continuing the transmission of power, and stopping the transmission of power due to an error or full charge is performed. In the power transfer phase, while real-time control of transmission power is performed, control for giving a notification of a charging state and stopping the transmission of power due to full charge is performed. The real-time control refers to control with high immediacy. In the power transfer phase, the transmission power is immediately controlled according to a request from the power reception apparatus. Consequently, for example, the power reception apparatus can appropriately control the output to the battery. The real-time control may not need to be controlled exactly at the same timing. That is, the transmission power may be controlled simultaneously with the request from the power reception apparatus, or the transmission power may be controlled within a somewhat short period in response to the request from the power reception apparatus.

In the present exemplary embodiment, the TX 101 and the RX 102 perform a series of operations of communication for power transmission control using either in-band communication or out-of-band communication by switching the in-band communication and the out-of-band communication. The in-band communication is communication in which a signal is superimposed on power via an antenna (a coil) used to transmit and receive the power. The range where the TX 101 and the RX 102 can perform the in-band communication based on the WPC standard with each other is almost the same as a power transmittable range (active area) 104. The out-of-band communication is communication using a frequency different from a frequency used to transmit and receive power via an antenna different from an antenna used to transmit and receive the power. The communication method used in the out-of-band communication is the BLE communication. The TX 101 operates as a central device in BLE, and the RX 102 operates as a peripheral device in BLE. The roles in BLE may be reversed. Alternatively, the communication method used in the out-of-band communication may be Wi-Fi (registered trademark) standardized by the Institute of Electrical and Electronics Engineers (IEEE) 802.11 series, ZigBee, near-field communication (NFC), or another communication method.

Configurations of Apparatuses

Next, the configurations of the power transmission apparatus (TX) 101 and the power reception apparatus (RX) 102 according to the present exemplary embodiment are described. The configurations described below are merely examples, part (or all in some cases) of the described configurations may be replaced with another configuration that serves another similar function, or may be omitted, and a further configuration may be added to the described configurations. Further, a single block illustrated in the following description may be divided into a plurality of blocks, or a plurality of blocks may be integrated into a single block.

Figure 2:
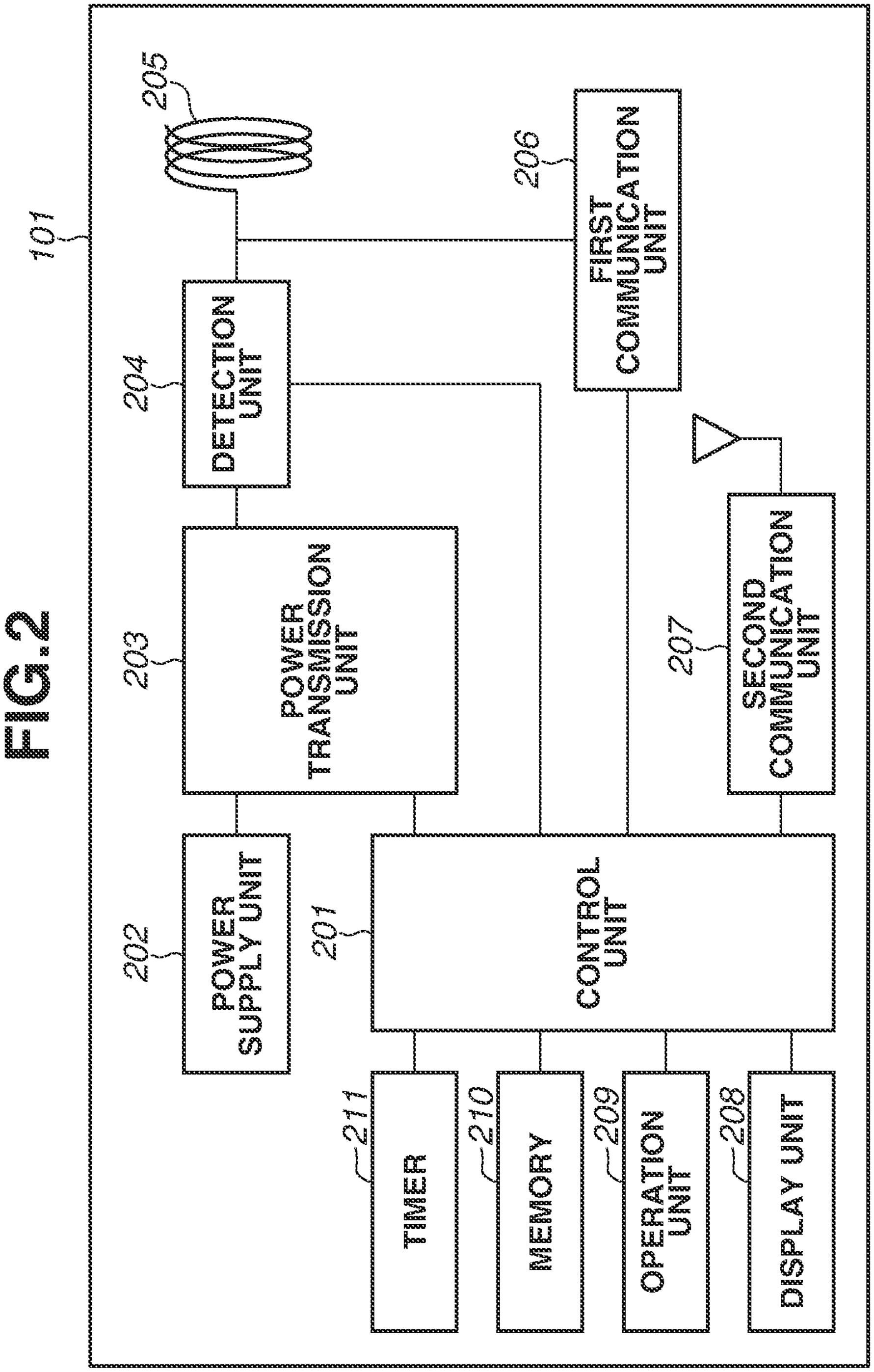
FIG. 2 is a diagram illustrating a configuration of a power transmission apparatus.

FIG. 2 is a diagram illustrating an example of the configuration of the TX 101 according to the present exemplary embodiment. As an example, the TX 101 includes a control unit 201, a power supply unit 202, a power transmission unit 203, a detection unit 204, a power transmission coil 205, a first communication unit 206, a second communication unit 207, a display unit 208, an operation unit 209, a memory 210, and a timer 211.

For example, the control unit 201 executes a control program stored in the memory 210, thereby controlling the entirety of the TX 101. As an example, the control unit 201 performs control required for the transmission of power in the TX 101. The control unit 201 may perform control for executing an application other than a wireless power transmission application. The control unit 201 includes one or more processors such as a central processing unit (CPU) and a microprocessor unit (MPU). The control unit 201 may include hardware such as an application-specific integrated circuit (ASIC). The control unit 201 may also include an array circuit such as a field-programmable gate array (FPGA) compiled to execute a predetermined process. The control unit 201 stores, in the memory 210, information that should be stored during the execution of various processes. The control unit 201 can also measure time using the timer 211.

The power supply unit 202 is a power supply that at least supplies power for the control unit 201 and the power transmission unit 203 to operate. For example, the power supply unit 202 can be a wired power reception circuit or a battery that receives the supply of power from mains electricity. The battery stores power supplied from mains electricity.

The power transmission unit 203 converts direct-current or alternating-current power input from the power supply unit 202 into alternating-current frequency power in a frequency range used in the wireless power transmission and inputs the alternating-current frequency power to the power transmission coil 205, thereby generating an electromagnetic wave with which to cause the RX 102 to receive power. The frequency of the alternating-current power generated by the power transmission unit 203 is about several hundreds of kilohertz (e.g., 110 kHz to 205 kHz) and is different from the communication frequency (2.4 GHz) of BLE used in the out-of-band communication. Based on an instruction from the control unit 201, the power transmission unit 203 inputs alternating-current frequency power to the power transmission coil 205 to cause the power transmission coil 205 to output an electromagnetic wave with which to transmit power to the RX 102. The power transmission unit 203 also adjusts a voltage (a power transmission voltage) or a current (a power transmission current) to be input to the power transmission coil 205, thereby controlling the intensity of the electromagnetic wave to be output. If the power transmission voltage or the power transmission current is increased, the intensity of the electromagnetic wave strengthens. If the power transmission voltage or the power transmission current is decreased, the intensity of the electromagnetic wave weakens. Based on an instruction from the control unit 201, the power transmission unit 203 also controls the output of the alternating-current frequency power so that the transmission of power from the power transmission coil 205 is started or stopped.

Based on the WPC standard, the detection unit 204 detects whether an object is present in the power transmittable range 104. For example, the detection unit 204 detects the voltage value or the current value of the power transmission coil 205 when the power transmission unit 203 transmits an analog ping in the WPC standard via the power transmission coil 205. Then, if the voltage falls below a predetermined voltage value, or if the current value exceeds a predetermined current value, the detection unit 204 can determine that an object is present in the range 104. The determination of whether this object is the RX 102 or a foreign object other than the RX 102 is made in such a manner that if a predetermined response to a digital ping subsequently transmitted through the in-band communication from the first communication unit 206 is received, it is determined that this object is the RX 102.

The first communication unit 206 performs communication in each phase in the WPC standard as described above with the RX 102 through the in-band communication. The first communication unit 206 modulates an electromagnetic wave output from the power transmission coil 205, thereby transmitting information to the RX 102. The first communication unit 206 also demodulates an electromagnetic wave output from the power transmission coil 205 and modulated by the RX 102, thereby acquiring information transmitted from the RX 102. That is, communication performed by the first communication unit 206 is performed by being superimposed on the transmission of power from the power transmission coil 205.

The second communication unit 207 performs communication in each phase in the WPC standard as described above with the RX 102 through the out-of-band communication. For example, the second communication unit 207 includes a modulation/demodulation circuit and a communication protocol processing function that are required to perform the BLE communication.

The display unit 208 presents information to a user by an arbitrary technique such as a visual, auditory, or tactile technique. For example, the display unit 208 notifies the user of information indicating the state of the TX 101 or the state of the wireless power transmission system including the TX 101 and the RX 102 as illustrated in FIG. 1. For example, the display unit 208 includes a liquid crystal display, a light-emitting diode (LED) display, an organic electroluminescent (EL) display, a loudspeaker, a vibration generation circuit, and another notification device.

The operation unit 209 has a reception function for receiving an operation of the user on the TX 101. For example, the operation unit 209 includes a button, a keyboard, a sound input device such as a microphone, a motion detection device such as an acceleration sensor or a gyro sensor, and another input device. Alternatively, a device obtained by integrating the display unit 208 and the operation unit 209 as in a touch panel may be used. As described above, the memory 210 stores various pieces of information. The memory 210 may store information obtained by a function unit different from the control unit 201. The timer 211 measures time using, for example, a count up timer that measures the time elapsed from the clock time when the count up timer is started, or a count down timer that counts down from a set time.

Figure 3:
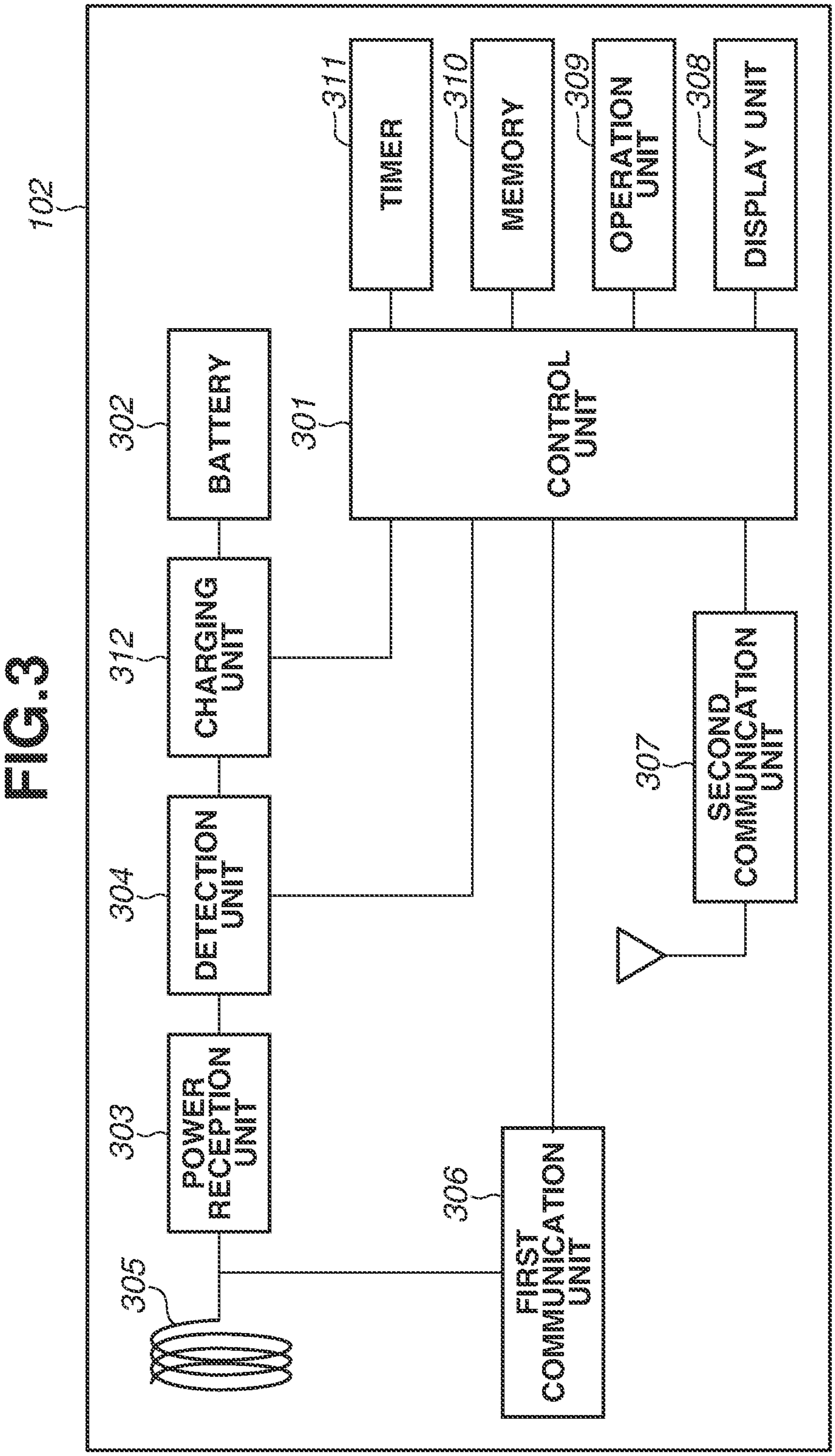
FIG. 3 is a diagram illustrating a configuration of a power reception apparatus.

FIG. 3 is a diagram illustrating an example of the configuration of the RX 102 according to the present exemplary embodiment. As an example, the RX 102 includes a control unit 301, a battery 302, a power reception unit 303, a detection unit 304, a power reception coil 305, a first communication unit 306, a second communication unit 307, a display unit 308, an operation unit 309, a memory 310, a timer 311, and a charging unit 312.

For example, the control unit 301 executes a control program stored in the memory 310, thereby controlling the entirety of the RX 102. As an example, the control unit 301 performs control required for the reception of power in the RX 102. The control unit 301 may perform control for executing an application other than a wireless power transmission application. The control unit 301 includes one or more processors such as a CPU and an MPU. The control unit 301 may include hardware dedicated to a specific process, such as an ASIC, or an array circuit such as an FPGA compiled to execute a predetermined process. The control unit 301 stores, in the memory 310, information that should be stored during the execution of various processes. The control unit 301 can also measure time using the timer 311.

The power reception unit 303 acquires alternating-current power generated by electromagnetic induction in the power reception coil 305. Specifically, an induced electromotive force is generated in the power reception coil 305 by an electromagnetic wave emitted from the power transmission coil 205 of the TX 101, and the power reception unit 303 acquires power generated in the power reception coil 305. Then, the power reception unit 303 converts alternating-current power into direct-current power or alternating-current power of a predetermined frequency and outputs the power to the charging unit 312 that performs a process for charging the battery 302. That is, the power reception unit 303 supplies the power to the load in the RX 102. The above GP is the power guaranteed to be output from the power reception unit 303. The battery 302 stores power received via the power reception coil 305.

Based on the WPC standard, the detection unit 304 detects that the RX 102 is placed in the range 104 where the RX 102 can receive power from the TX 101. For example, the detection unit 304 detects the voltage value or the current value of the power reception coil 305 when the power reception unit 303 receives power with a digital ping in the WPC standard via the power reception coil 305. For example, if the voltage falls below a predetermined voltage threshold, or if the current value exceeds a predetermined current threshold, the detection unit 304 can determine that the RX 102 is placed in the range 104.

The first communication unit 306 performs communication in each phase in the WPC standard as described above with the TX 101 through the in-band communication. The first communication unit 306 demodulates an electromagnetic wave input from the power reception coil 305, thereby acquiring information transmitted from the TX 101. Then, the first communication unit 306 performs load modulation on the electromagnetic wave, thereby superimposing information that should be transmitted to the TX 101 on the electromagnetic wave, the first communication unit 306 communicating with the TX 101 as a consequence. That is, communication performed by the first communication unit 306 is performed by being superimposed on the transmission of power from the power transmission coil 205 of the TX 101.

The second communication unit 307 performs communication in each phase in the WPC standard as described above with the TX 101 through the out-of-band communication. For example, the second communication unit 307 includes a modulation/demodulation circuit and a communication protocol processing function that are required to perform the BLE communication.

The display unit 308 presents information to the user by an arbitrary technique such as a visual, auditory, or tactile technique. For example, the display unit 308 notifies the user of the state of the RX 102 or the state of the wireless power transmission system including the TX 101 and the RX 102 as illustrated in FIG. 1. For example, the display unit 308 includes a liquid crystal display, an LED display, an organic EL display, a loudspeaker, a vibration generation circuit, and another notification device.

The operation unit 309 has a reception function for receiving an operation of the user on the RX 102. For example, the operation unit 309 includes a button, a keyboard, a sound input device such as a microphone, a motion detection device such as an acceleration sensor or a gyro sensor, and another input device. Alternatively, a device obtained by integrating the display unit 308 and the operation unit 309 as in a touch panel may be used. As described above, the memory 310 stores various pieces of information. The memory 310 may store information obtained by a function unit different from the control unit 301. The timer 311 measures time using, for example, a count up timer that measures the time elapsed from the clock time when the count up timer is started, or a count down timer that counts down from a set time.

Flow of Processing

Next, an example of the flow of a power transmission/reception control process executed by the TX 101 and the RX 102 is described.

Figure 4:
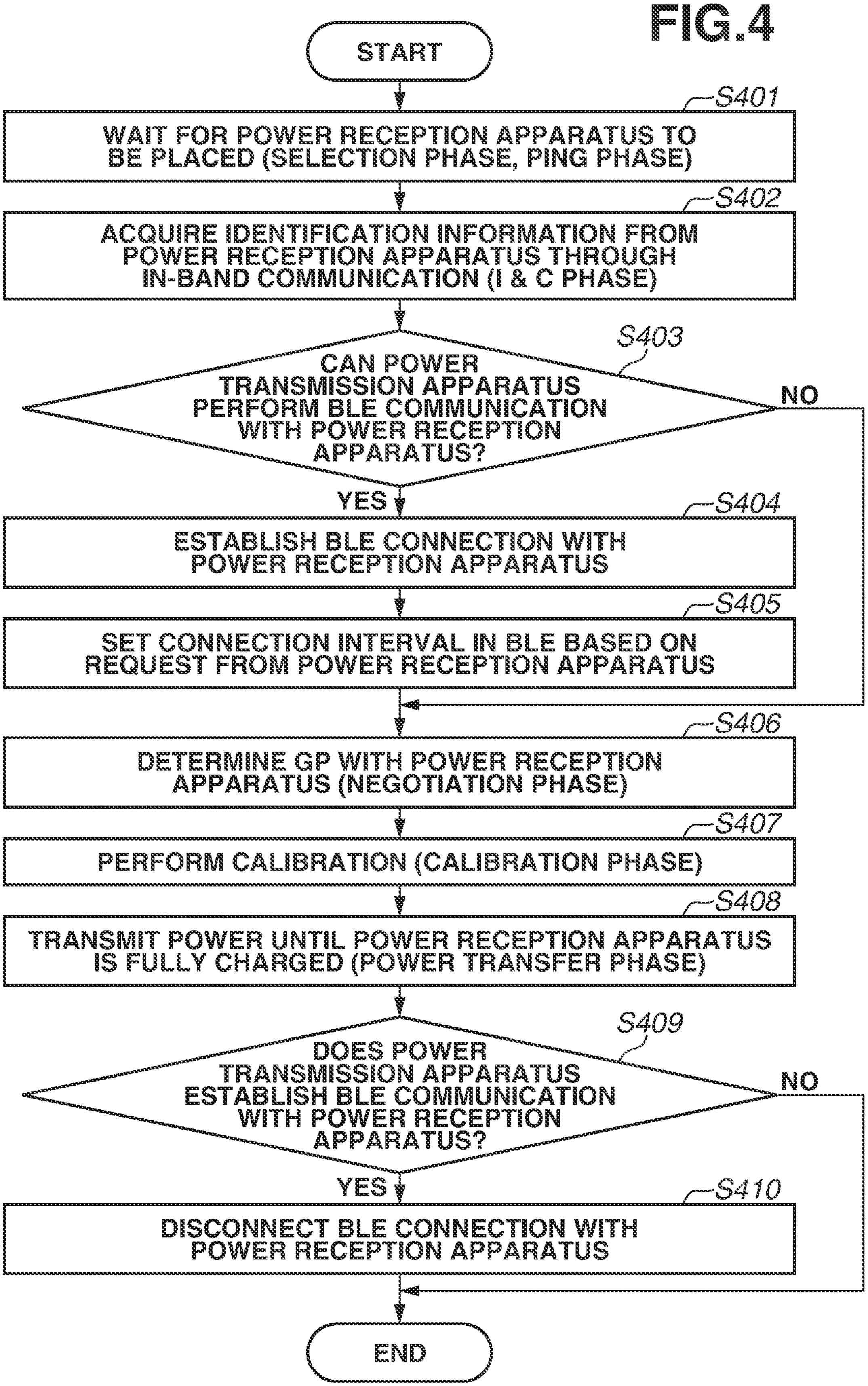
FIG. 4 is a flowchart of a process performed by the power transmission apparatus according to a first exemplary embodiment.

FIG. 4 is a flowchart illustrating an example of the flow of a power transmission control process executed by the TX 101. This processing can be achieved by, for example, the control unit 201 of the TX 101 executing a program read from the memory 210. At least a part of the following procedure may be achieved by hardware. The hardware in this case can be achieved by, for example, using a predetermined compiler to automatically generate a dedicated circuit that uses a gate array circuit such as an FPGA according to a program for achieving processing steps. This processing can be executed according to the fact that the TX 101 is powered on, or according to the fact that the user of the TX 101 inputs an instruction to start the wireless power transmission application, or according to the fact that the TX 101 is connected to commercial power supply and receives the supply of power. Alternatively, this processing may be started using another trigger.

First, the TX 101 executes a process defined as the selection phase and the ping phase in the WPC standard and waits for the RX 102 to be placed (step S401). The TX 101 repeatedly and intermittently transmits an analog ping in the WPC standard and detects an object present in the power transmittable range 104. Then, if the TX 101 detects that an object is present in the power transmittable range 104, the TX 101 transmits a digital ping. Then, if a predetermined response to the digital ping is received, the TX 101 determines that the detected object is the RX 102 and the RX 102 is placed on the charging stand 103.

Figure 10A:
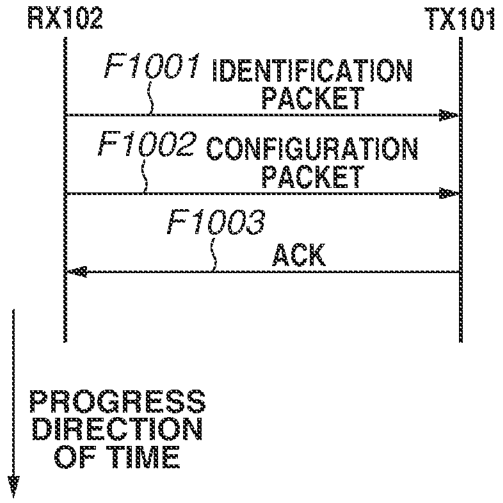
FIG. 10A is a diagram illustrating a communication sequence of an identification and configuration (I & C) phase.

If the TX 101 detects the placement of the RX 102, the TX 101 acquires identification information from the RX 102 through the in-band communication by performing communication in the I & C phase defined by the WPC standard (step S402). FIG. 10A illustrates the flow of the communication in the I & C phase. In the I & C phase, the RX 102 transmits an identification packet (an ID packet) to the TX 101 (step F1001). The ID packet stores a manufacturer code and basic device ID that are identification information regarding each individuality of the RX 102, and also an information element that allows specifying of a version of the WPC standard with which the RX 102 is compatible. Further, the RX 102 transmits a configuration packet to the TX 101 (step F1002). The configuration packet includes a maximum power value that is a value for specifying the maximum power that the RX 102 can supply to the load, and information indicating whether the RX 102 has the negotiation function in the WPC standard. When the TX 101 receives these packets, the TX 101 transmits ACK (step F1003), and the I & C phase ends. Alternatively, the TX 101 may acquire the identification information regarding the RX 102 using a method other than the communication in the I & C phase in the WPC standard. Further, the identification information regarding each individuality of the RX 102 may be wireless power ID. Further, the identification information regarding each individuality of the RX 102 may be any other identification information that allows the identification of the individuality of the RX 102, such as a Bluetooth address (hereinafter referred to as "BD_ADDR") specific to the second communication unit 307 of the RX 102. BD_ADDR is an 8-byte address used in BLE. For example, BD_ADDR is a public address defined by the BLE standard and indicating the manufacturer of the RX 102 or individual identification information regarding a BLE communication function (the second communication unit 307). Alternatively, BD_ADDR may be a random address.

Next, the TX 101 determines whether the TX 101 can perform the out-of-band communication using BLE with the RX 102 (step S403). Specifically, the TX 101 waits for an advertising packet including the identification information regarding the RX 102 using BLE (using the second communication unit 207). For example, the TX 101 performs a BLE scan operation and waits for an advertising packet including information indicating that the identification information regarding the RX 102 is included and the identification information regarding the RX 102. For example, the AD type of an advertising packet in the BLE standard is set to a predetermined value, thereby indicating that the advertising packet includes the identification information regarding the RX 102. Further, it is defined in advance that if the AD type is the predetermined value, AD data includes the identification information regarding the RX 102. Then, by sharing this definition by the TX 101 and the RX 102, the TX 101 can wait for an advertising packet including the above information. The identification information regarding the RX 102 is information for identifying each individuality of the RX 102. For example, the identification information regarding the RX 102 is a manufacturer code and basic device ID defined by the WPC standard. Alternatively, the identification information regarding the RX 102 may be wireless power ID or BD_ADDR specific to the second communication unit 307 of the RX 102. In a case where BD_ADDR is used as the identification information regarding the RX 102, the identification information is included not in the AD data but in a header portion of an advertising packet. If the TX 101 receives an advertising packet including the identification information regarding the RX 102 within a predetermined time, the TX 101 determines that the TX 101 can perform the out-of-band communication using BLE with the RX 102. If not, the TX 101 determines that the TX 101 cannot perform the out-of-band communication using BLE with the RX 102. Alternatively, it may be determined whether the TX 101 can perform the out-of-band communication using BLE with the RX 102 using another method. For example, the configuration packet may store information regarding whether the RX 102 is compatible with the out-of-band communication, or whether the RX 102 is in the state where the RX 102 can perform communication. In this case, based on a corresponding information element in the configuration packet, the TX 101 may determine whether the TX 101 can perform the out-of-band communication using BLE with the RX 102. Consequently, if the TX 101 cannot perform the out-of-band communication using BLE with the RX 102, it is possible to eliminate the time to wait for an advertising packet. Thus, it is possible to hasten the start of the transmission of power to the power reception apparatus.

If it is determined that the TX 101 can perform the out-of-band communication (YES in step S403), the TX 101 establishes a BLE connection with the RX 102 that is the transmission source of the advertising packet (step S404). The TX 101 transmits CONNECT_REQ which is a connection request in the BLE standard in response to BD_ADDR included in a header portion of the advertising packet from the RX 102, thereby establishing a BLE connection with the RX 102. Next, based on a request from the RX 102, the TX 101 sets a connection interval which is the interval of intermittent communication in BLE (step S405). This setting is made by receiving LL_CONNECTION_PARAM_REQ in the BLE standard from the RX 102 and returning LL_CONNECTION_UPDATE_IND. The TX 101 performs subsequent communication with the RX 102 through the out-of-band communication using BLE. If it is determined that the TX 101 cannot perform the out-of-band communication with the RX 102 (NO in step S403), the processes of steps S404 and S405 are skipped, and the TX 101 performs subsequent communication with the RX 102 through the in-band communication.

Figure 10B:
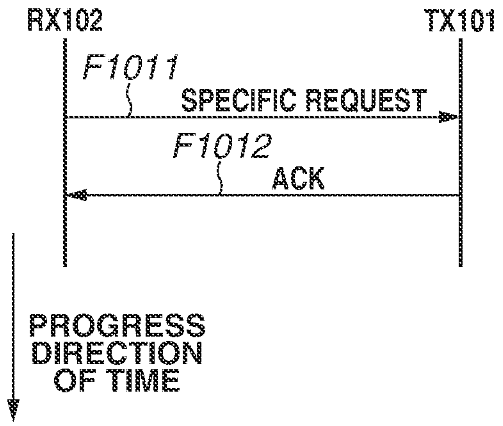
FIG. 10B is a diagram illustrating a communication sequence of a negotiation phase.

Next, based on a request from the RX 102 and the power transmission capability of the TX 101, the TX 101 determines the GP by a negotiation with the RX 102 (step S406). In step S406, communication in the negotiation phase in the WPC standard as illustrated in FIG. 10B is performed. First, the RX 102 transmits a specific request to the TX 101, thereby notifying the TX 101 of the value of the GP requested by the RX 102 (step F1011). Based on the power transmission capability of the TX 101 and other conditions, the TX 101 determines whether the TX 101 accepts the request. If the TX 101 accepts the request, the TX 101 transmits ACK to the RX 102 (step F1012), and if the TX 101 does not accept the request, the TX 101 transmits NACK to the RX 102. If the TX 101 accepts the request from the RX 102, the value of the GP to be determined is the value requested by the RX 102. If not, the value of the GP to be determined is a predetermined value (e.g., 5 watts) defined by the WPC standard.

Next, the TX 101 performs a process in the calibration phase in the WPC standard (step S407). The process in the calibration phase is advance measurement for detecting a foreign object between the TX 101 and the RX 102 with high accuracy, but is similar to that of the conventional art, and therefore is not described in detail here.

Figure 10C:
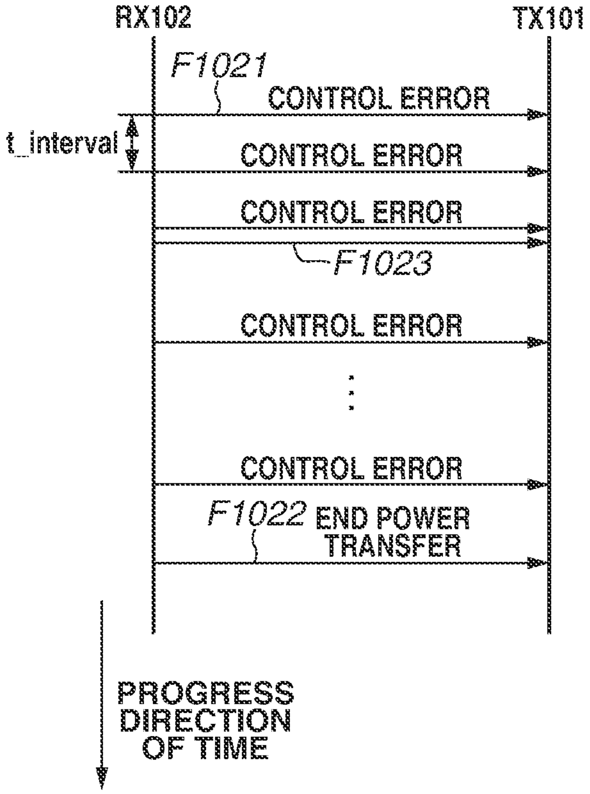
FIG. 10C is a diagram illustrating a communication sequence of a power transfer phase.

Then, the TX 101 transmits power until the RX 102 is fully charged (step S408). In step S408, communication in the power transfer phase in the WPC standard as illustrated in FIG. 10C is performed. The RX 102 repeatedly transmits a control error packet (hereinafter referred to as a "CE packet") to the TX 101 at a time interval t_interval (step F1021). t_interval is a value defined by the WPC standard and is 250 milliseconds, for example. Each CE packet includes a request as to how much the transmission power is to be increased or decreased. The TX 101 controls the current of the power transmission antenna 205 based on a received CE packet, thereby adjusting the transmission power. That is, the CE packet is a parameter for adjusting the transmission power. This process is repeated, whereby the transmission of power with appropriate power according to a request from the RX 102 is performed almost in real time.

If the RX 102 is fully charged, the RX 102 transmits an end power transfer packet (hereinafter referred to as an "EPT packet"), thereby ending the power transfer phase (step F1022). The RX 102 may transmit the EPT packet for a reason other than full charge. If the power transfer phase ends, the TX 101 stops the transmission of power for charging to the RX 102.

If the TX 101 does not receive a next CE packet even when t_timeout elapses since the TX 101 has received a CE packet last, the TX 101 determines that the RX 102 has been removed from the charging stand 103, and the power transfer phase ends. t_timeout is a value defined by the WPC standard and is 1500 milliseconds, for example.

During the power transfer phase, the RX 102 may transmit a packet other than a CE packet (step F1023). An example of a packet other than a CE packet is a charge status packet that notifies the TX 101 of the state of the battery 302 of the RX 102. The charge status packet stores a charge status value indicating to what percent the battery 302 is charged. If the TX 101 receives the charge status packet, for example, the TX 101 may display characters or a diagram on the display unit 208 based on the charge status value, thereby notifying the user of the charging state. The TX 101 may receive the charge status packet any time and notify the user of the charging state any time.

Figure 11:
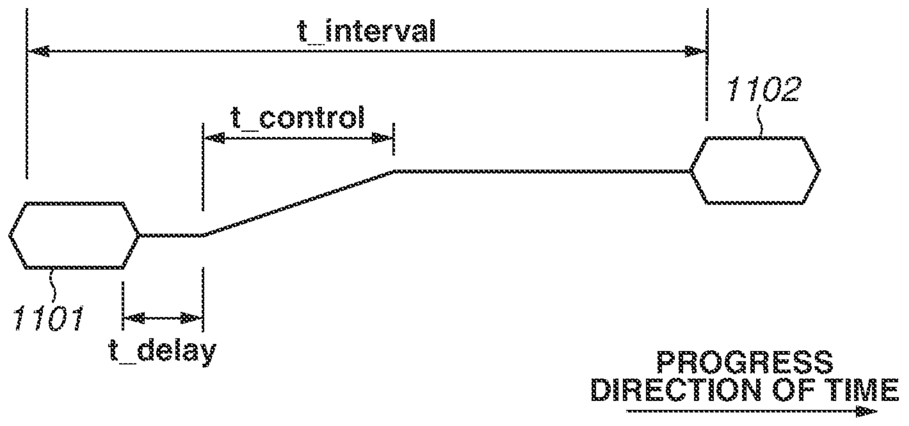
FIG. 11 is a diagram illustrating timing constraints in real-time control of transmission power.

The processing of the real-time control of the transmission power performed between the TX 101 and the RX 102 is described with reference to FIG. 11. After the TX 101 receives a CE packet 1101 and t_delay elapses, the TX 101 spends a time t_control to adjust the transmission power based on a control error value included in the CE packet 1101. t_delay and t_control are values determined in ranges defined by the WPC standard and are 5 milliseconds and 25 milliseconds, respectively, for example. After the transmission of the CE packet 1101, the RX 102 is prohibited from transmitting a next CE packet 1102 until the TX 101 completes the adjustment of the transmission power based on the CE packet. That is, after the transmission of the CE packet 1101, the RX 102 can transmit the next CE packet 1102 only after at least the total time of t_delay and t_control elapses. In the power transfer phase, the TX 101 and the RX 102 perform the real-time control of the transmission power under the above timing constraints represented by t_interval, t_timeout, t_delay, and t_control. Information regarding these timing constraints may be held in advance in the memory 210 of the TX 101 and the memory 310 of the RX 102, or the RX 102 may hold the information and notify the TX 101 of the information in the I & C phase. The TX 101 may hold the information and notify the RX 102 of the information, or the RX 102 or the TX 101 may notify the other of the information at a timing other than the I & C phase.

As described above, a CE packet is a packet for the real-time control (hereinafter referred to as "a real-time control packet"). In contrast, a notification to the user using a charge status packet does not have constraints regarding the timings of transmission, reception, and processing. That is, a charge status packet is not a real-time control packet. There may also be another packet not for the real-time control.

Referring back to FIG. 4, after the power transfer phase ends, and if the TX 101 had established a BLE connection with the RX 102 in step S403, the TX 101 disconnects this BLE connection, and the processing ends (YES in step S409, and step S410). After step S410, the TX 101 may further continue to communicate with the RX 102, however, in this case, the TX 101 communicates with the RX 102 through the in-band communication.

Next, an example of the flow of a power reception control process executed by the RX 102 is described with reference to FIG. 5. This processing can be achieved by, for example, the control unit 301 of the RX 102 executing a program read from the memory 310. At least a part of the following procedure may be achieved by hardware. The hardware in this case can be achieved by, for example, using a predetermined compiler to automatically generate a dedicated circuit that uses a gate array circuit such as an FPGA according to a program for achieving processing steps.

After the power reception control process is started, the RX 102 executes a process defined as the selection phase and the ping phase in the WPC standard and waits to be placed on the TX 101 (step S501). For example, the RX 102 detects a digital ping from the TX 101, thereby detecting that the RX 102 is placed on the TX 101.

If the RX 102 detects that the RX 102 is placed on the TX 101, the RX 102 transmits information including identification information regarding the RX 102 to the TX 101 through the in-band communication, using an ID packet and a configuration packet as described with reference to FIG. 10A (step S502). The identification information regarding the RX 102 may be transmitted using a method other than the communication in the I & C phase in the WPC standard. Alternatively, other identification information such as BD_ADDR may be used so long as the information allows the identification of each individuality of the RX 102. In step S502, the RX 102 may also transmit information other than the identification information to the TX 101.

Next, the RX 102 determines whether the RX 102 can perform the out-of-band communication using BLE with the TX 101 (step S503). Specifically, the RX 102 repeatedly transmits an advertising packet including the identification information regarding the RX 102 using BLE (using the second communication unit 307) and waits for CONNECT_REQ in BLE from the TX 101. For example, the RX 102 sets the AD type of an advertising packet in BLE to a predetermined value, thereby indicating that the advertising packet includes the identification information regarding the RX 102. For example, the identification information regarding the RX 102 is a manufacturer code and basic device ID defined by the WPC standard. Alternatively, the identification information regarding the RX 102 may be wireless power ID or BD_ADDR specific to the second communication unit 307 of the RX 102. If the RX 102 receives CONNECT_REQ from the TX 101 within a predetermined time, the RX 102 determines that the RX 102 can perform the out-of-band communication using BLE with the TX 101. If not, the RX 102 determines that the RX 102 cannot perform the out-of-band communication using BLE with the TX 101. Alternatively, it may be determined whether the RX 102 can perform the out-of-band communication using BLE with the TX 101 using another method. For example, the RX 102 may receive information or a signal indicating that the TX 101 is compatible with BLE from the TX 101, or may receive information or a signal indicating that the TX 101 can perform communication using BLE from the TX 101. In this case, based on the received information or signal, the RX 102 may determine whether the RX 102 cannot perform the out-of-band communication using BLE with the TX 101. Consequently, if the RX 102 cannot perform the out-of-band communication using BLE with the TX 101, it is possible to shorten the time to wait for the reception of CONNECT_REQ. Thus, it is possible to hasten the start of the transmission of power.

If it is determined that the RX 102 can perform the out-of-band communication (YES in step S503), the RX 102 establishes a BLE connection with the TX 101 that is the transmission source of CONNECT_REQ (step S504). The RX 102 receives CONNECT_REQ, thereby establishing a BLE connection. Next, the RX 102 requests the TX 101 to set a connection interval which is the interval of intermittent communication in BLE to the same time as the expected transmission interval of a real-time control packet (hereinafter referred to as a "Qi packet" to explicitly distinguish the packet from a packet in BLE) (step S505). An example of the Qi packet for the real-time control is a CE packet, and the expected transmission interval of the CE packet is t_interval. For example, the RX 102 makes the request to set the connection interval by transmitting LL_CONNECTION_PARAM_REQ in the BLE standard. Alternatively, the RX 102 may request the TX 101 to set the connection interval to a fraction of t_interval obtained by dividing by an integer instead of making the connection interval the same as t_interval. For example, if t_interval=250 milliseconds, the connection interval may be set to 125 milliseconds, which is one-half of 250 milliseconds.

The RX 102 performs subsequent communication with the TX 101 through the out-of-band communication using BLE. If it is determined that the RX 102 cannot perform the out-of-band communication with the TX 101 (NO in step S503), the processes of steps S504 and S505 are skipped, and the RX 102 performs subsequent communication with the TX 101 through the in-band communication.

Next, the RX 102 transmits the requested value of the GP to the TX 101, waits for a response from the TX 101, and determines the GP (step S506). In step S506, communication in the negotiation phase in the WPC standard as described with reference to FIG. 10B is performed.

Next, the RX 102 performs a process in the calibration phase in the WPC standard (step S507). The process in the calibration phase is advance measurement for detecting a foreign object between the TX 101 and the RX 102 with high accuracy, but is similar to that of the conventional art, and therefore is not described in detail here.

Then, the RX 102 receives power until the battery 302 is fully charged (step S508). In step S508, as described with reference to FIG. 10C, the RX 102 repeatedly transmits a CE packet at the interval t_interval, transmits an EPT packet last, and ends this phase.

Referring back to FIG. 5, after the power transfer phase ends, and if the RX 102 had established a BLE connection with the RX 102 in step S503, the RX 102 disconnects this BLE connection, and the processing ends (YES in step S509, and step S510). After step S510, the RX 102 may further continue to communicate with the TX 101. In this case, however, the RX 102 communicates with the TX 101 through the in-band communication.

As described above, if the TX 101 and the RX 102 can perform the out-of-band communication using BLE with each other (YES in steps S403 and S503), the TX 101 and the RX 102 perform communication in the following phases using BLE. Specifically, the phases are the negotiation phase, the calibration phase, and the power transfer phase. Even when the TX 101 and the RX 102 can perform the out-of-band communication using BLE with each other, the TX 101 and the RX 102 may not need to perform all the above communication using BLE. For example, the TX 101 and the RX 102 may perform only the communication in the power transfer phase using BLE.

A description is given of a method for transmitting a Qi packet defined by the WPC standard, using a communication signal used in the BLE communication (hereinafter referred to as a "BLE packet"). In the present exemplary embodiment, each of the second communication units 207 and 307 is configured so that after a BLE connection is established, the TX 101 operates as a Generic Attribute Profile (GATT) client in the BLE standard, and the RX 102 operates as a GATT server in the BLE standard. At this time, the TX 101 performs a write characteristic value process in the BLE standard, and the RX 102 performs a handle value notification process (hereinafter referred to as a "notify process"). Consequently, each of the TX 101 and the RX 102 can transmit an arbitrary byte string up to 20 bytes as an attribute value in the BLE standard. The upper limit up to 20 bytes can also be further extended by performing an exchange maximum transmission unit (MTU) process in the BLE standard. Alternatively, the TX 101 may be a GATT server, and the RX 102 may be a GATT client. Yet alternatively, each of the TX 101 and the RX 102 may be configured to transmit an arbitrary byte string using a profile in BLE other than GATT. That is, a plurality of Qi packets is stored in the attribute value of a BLE communication packet.

Figure 8:
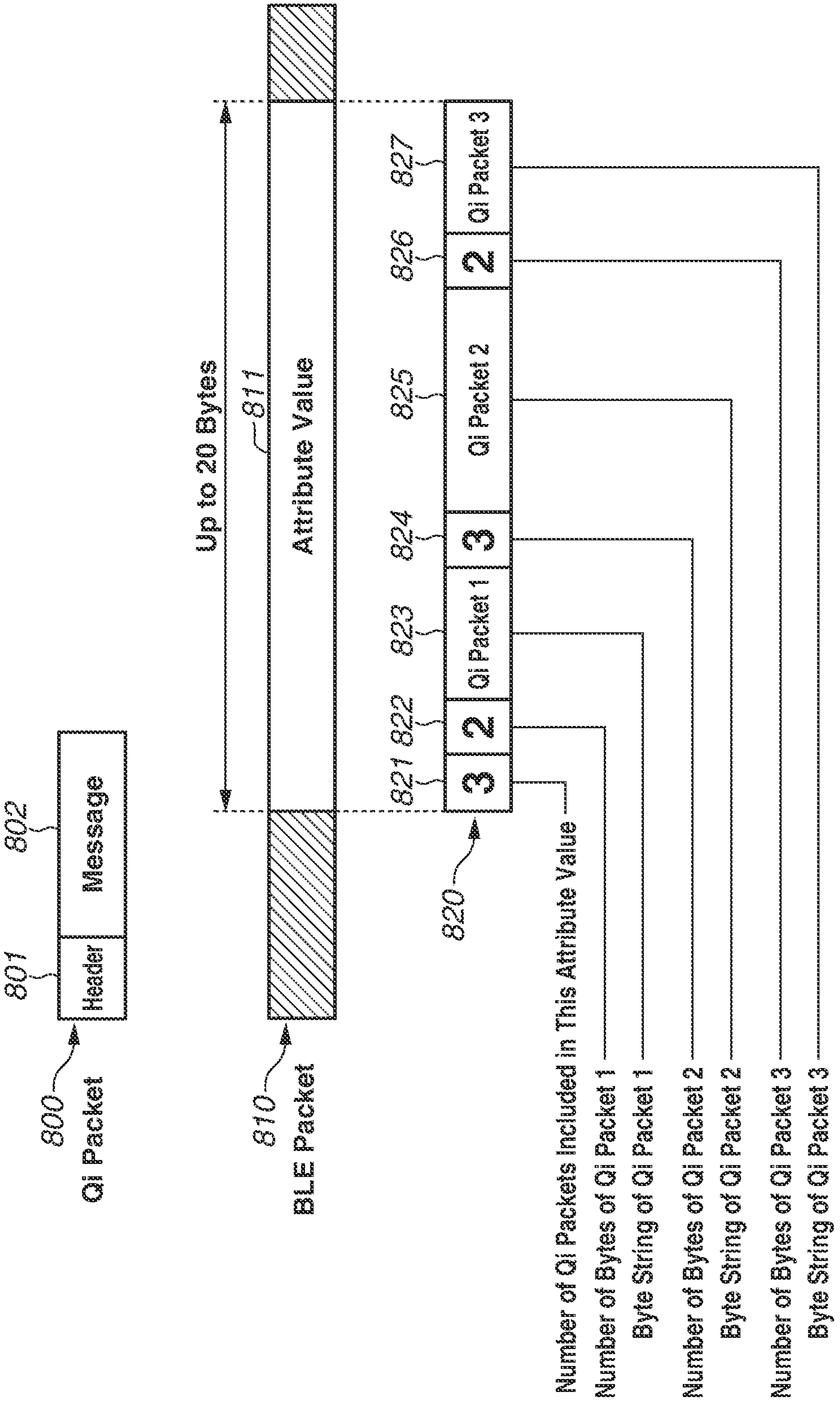
FIG. 8 is a diagram illustrating a relationship between a BLE packet and a Qi packet.
Figure 9:
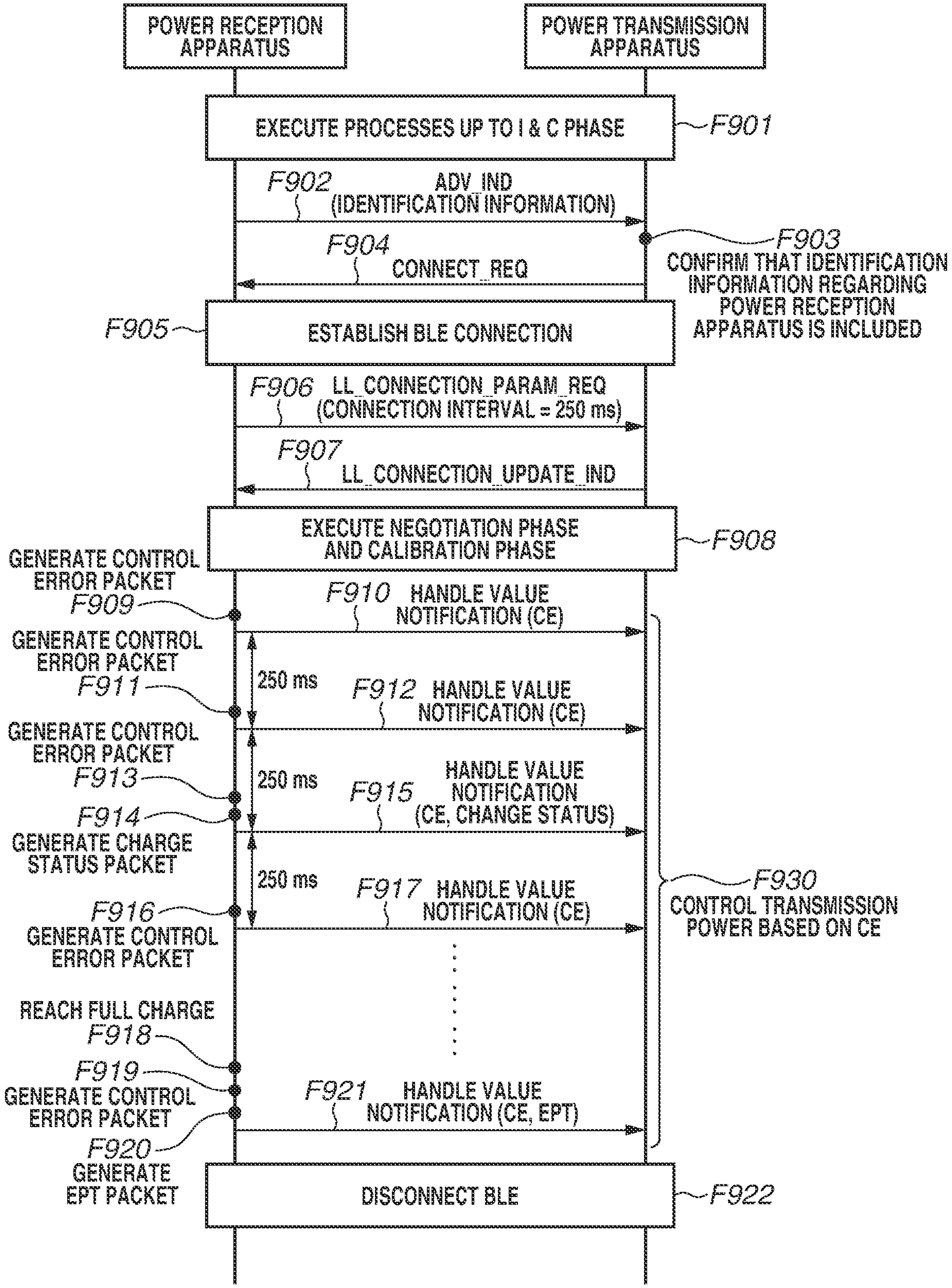
FIG. 9 is a diagram illustrating an operation of the system.

The size of a Qi packet in the WPC standard is smaller than the upper limit of the attribute value of a BLE packet. Thus, in the present exemplary embodiment, one or more Qi packets are collectively stored in one BLE packet and transmitted. FIG. 8 illustrates an example where three Qi packets are stored in one BLE packet. The same applies to a case where the number of Qi packets is other than three. First, the structure of a Qi packet is described. A Qi packet 800 includes a header 801 and a message 802. The header 801 has a 1-byte value indicating the type of the Qi packet such as a CE packet or an EPT packet. For example, in the case of a CE packet, the value of the header 801 is 03 in hexadecimal. The message 802 is a byte string defined with respect to each type of the Qi packet, and the number of bytes of the message 802 differs with respect to each type of the Qi packet. For example, if the type of the packet is a CE packet, the message 802 has a control error value with a length of 1 byte. A Qi packet in the WPC standard also includes preamble and checksum, but preamble and checksum are unnecessary if the Qi packet is transmitted using BLE, and therefore description thereof will be omitted. A byte string 820 in FIG. 8 is stored in an attribute value 811 of a BLE packet 810. In an area 821 at the beginning of the byte string 820, the number of Qi packets included in this attribute value is stored. In this example, the area 821 indicates 3. In a next area 822, the number of bytes of the first Qi packet is stored, and in an area 823, the contents, i.e., the header 801 and the message 802, of the first Qi packet are stored. Similarly, in areas 824 and 825, information regarding the second Qi packet is stored. In areas 826 and 827, information regarding the third Qi packet is stored. In this manner, a plurality of Qi packets is stored in one BLE packet. The above storage format is merely an example, and another storage format may be used.

Figure 6:
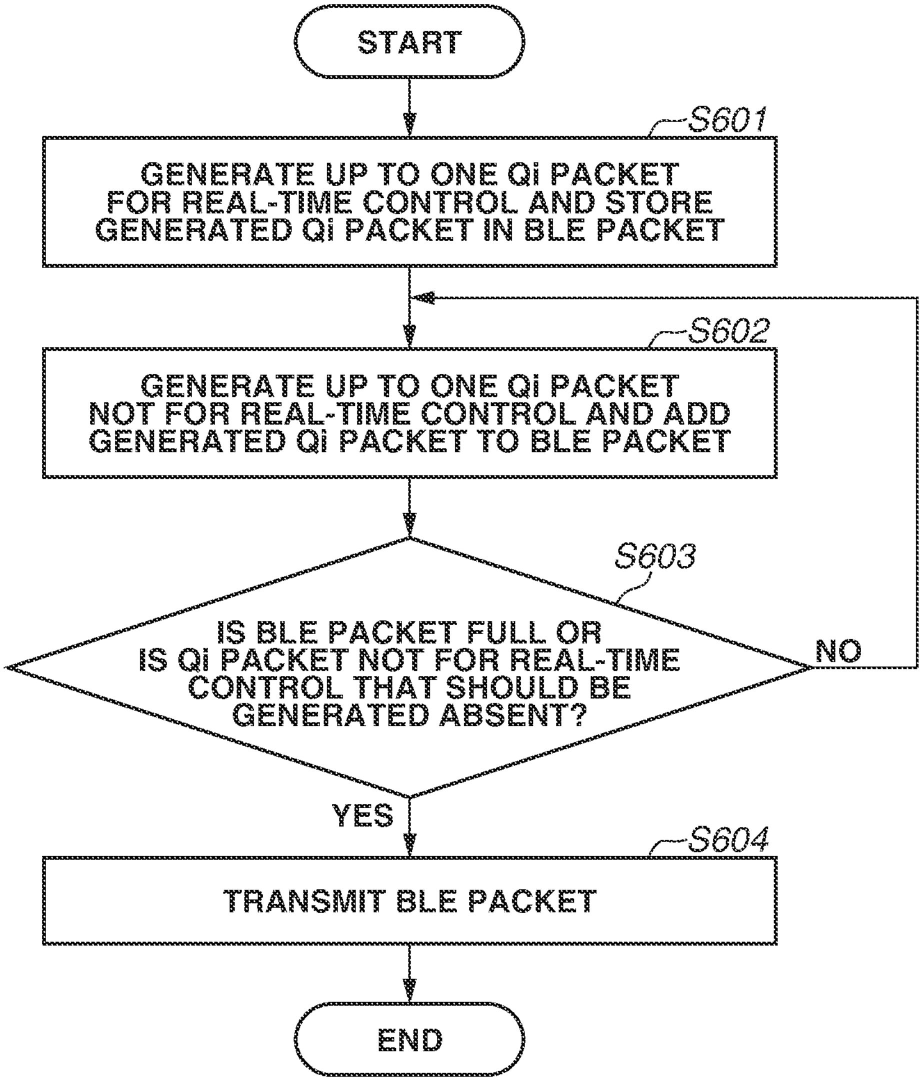
FIG. 6 is a flowchart of a transmission process at a single connection interval in Bluetooth (registered trademark) Low Energy (BLE).

Next, a transmission process for transmitting a BLE packet is described with reference to FIG. 6. FIG. 6 illustrates the transmission process at a single connection interval, which is the cycle of intermittent communication in BLE. The following description is given of a case where the RX 102 transmits the BLE packet and the TX 101 receives the BLE packet. However, the same applies to a case where the roles are reversed. First, the control unit 301 of the RX 102 generates up to one Qi packet for the real-time control and stores the one Qi packet in a BLE packet (step S601). The number of Qi packets for the real-time control to be stored in a BLE packet is limited to up to one. On the other hand, the number of Qi packets other than those for the real-time control to be stored in a BLE packet is not limited to one or less. That is, two or more Qi packets of types different from that of a Qi packet for the real-time control may be stored in a BLE packet even when the two or more Qi packets are of the same type as each other. An example of the Qi packet for the real-time control is a CE packet. The RX 102 stores in advance the value of a header indicating the type of a Qi packet for the real-time control in the memory 310 and refers to the stored value when the RX 102 generates a Qi packet, thereby distinguishing a Qi packet for the real-time control. If a Qi packet for the real-time control is not generated in step S601, nothing is stored in the BLE packet, and the processing proceeds to step S602. That is, if a Qi packet that should be generated is absent in step S601, the RX 102 does not wait, and the processing proceeds to step S602.

Next, the RX 102 generates up to one Qi packet not for the real-time control and stores the one Qi packet in the BLE packet (step S602). This process is repeated until the BLE packet is full or a Qi packet not for the real-time control that should be generated is absent (step S603). A description is given of the processing in a case where a Qi packet cannot be added because the BLE packet is full in step S602, i.e., in a case where the byte string 820 in FIG. 8 reaches the upper limit of the size of the attribute value. In this case, a Qi packet exceeding the upper limit in step S602 is temporarily saved in the memory 310 and added to a BLE packet in step S602 at the next connection interval. In steps S602 and S603, if a Qi packet not for the real-time control that should be generated is absent, nothing is added to the BLE packet. That is, if a Qi packet not for the real-time control that should be generated is absent in steps S602 and S603, the RX 102 does not wait, and the processing proceeds to step S604. The number of Qi packets for the real-time control to be stored in a BLE packet is limited to up to one. On the other hand, the number of Qi packets other for than those for the real-time control to be stored in a BLE packet is not limited to one or less. Thus, if NO in step S603, the processing returns to step S602. The BLE packet created by the RX 102 at this time includes any of the following.

- A BLE packet including one Qi packet for the real-time control
- A BLE packet including one Qi packet for the real-time control and one Qi packet other than that for the real-time control
- A BLE packet including one Qi packet for the real-time control and a plurality of Qi packets other than those for the real-time control
- A BLE packet including one Qi packet other than that for the real-time control
- A BLE packet including a plurality of Qi packets other than those for the real-time control
- A BLE packet including neither a Qi packet for the real-time control nor a Qi packet other than that for the real-time control If the BLE packet is full or a Qi packet not for the real-time control that should be generated is absent (YES in step S603), the RX 102 transmits the BLE packet with the contents of the attribute value at this time (step S604). Specifically, for example, the control unit 301 of the RX 102 instructs the second communication unit 307 to perform a notify process including the contents of the attribute value. Then, the second communication unit 307 transmits the BLE packet including the above attribute value at the next connection interval. In each of steps S601 to S603, the RX 102 does not wait if a Qi packet that should be generated is absent, and thus there is a case where no Qi packet is stored in the BLE packet at the time of step S604. In this case, the BLE packet may not be transmitted, or the BLE packet may be transmitted by setting information regarding the number in the area 821 at the beginning of the attribute value to 0.

Based on the above, the transmission process at the single connection interval by the RX 102 ends. The RX 102 repeats the above process at each connection interval during the period when a BLE connection is made.

Figure 7:
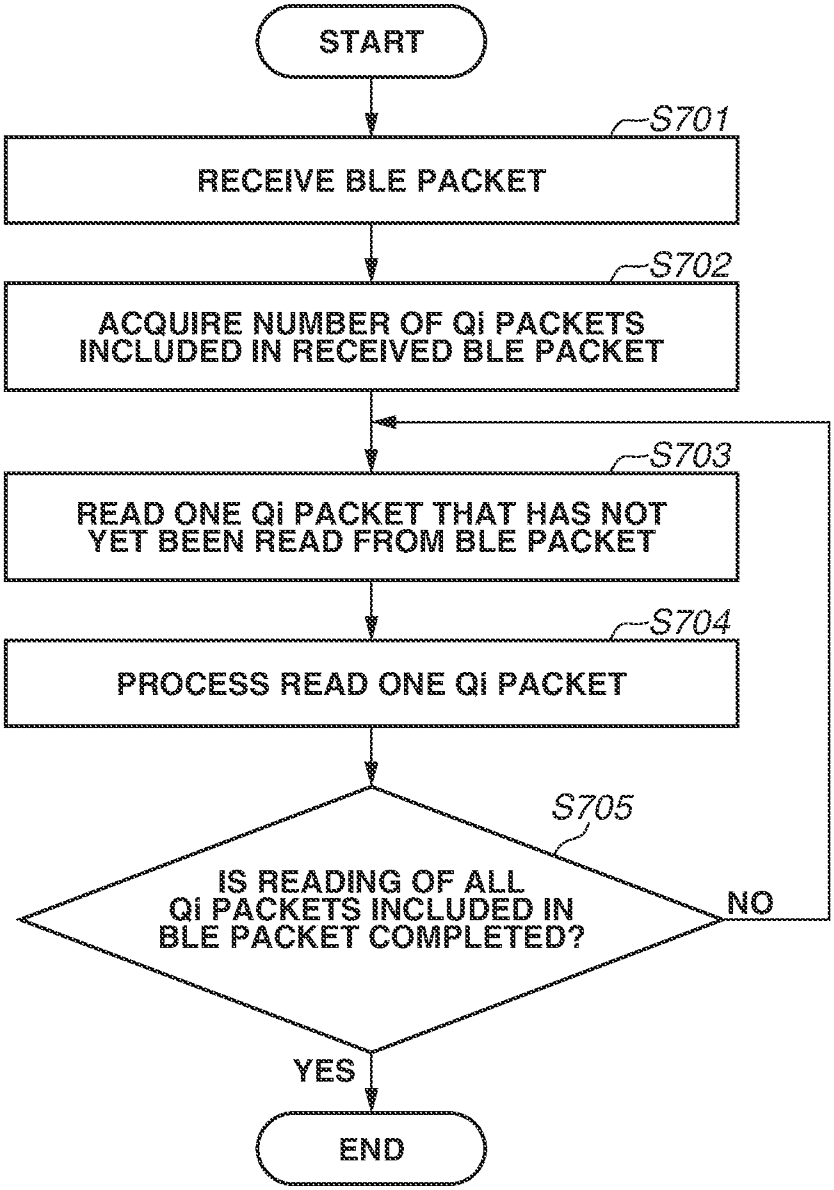
FIG. 7 is a flowchart of a reception process at a single connection interval in BLE.

Next, with reference to FIG. 7, a reception process for receiving a BLE packet is described. FIG. 7 illustrates the reception process at a single connection interval, which is the cycle of intermittent communication in BLE. The following description is given of a case where the TX 101 receives the BLE packet and the RX 102 transmits the BLE packet. However, the same applies to a case where the roles are reversed.

First, the TX 101 receives a BLE packet (step S701). For example, this process is performed by the second communication unit 207 of the TX 101 notifying the control unit 201 that a BLE packet has been received, and the control unit 201 reading the contents of the attribute value of the BLE packet from the second communication unit 207.

Next, the TX 101 acquires the number of Qi packets included in the received BLE packet (step S702). For example, the number of Qi packets can be acquired by reading the area 821 of the byte string 820 of the attribute value. Next, the TX 101 reads one Qi packet that has not yet been read from the BLE packet (step S703). For example, the TX 101 reads the area 822 of the attribute value, acquires the number of bytes of the Qi packet, and reads a byte string that continues for the acquired number of bytes, and thereby can read the contents of the Qi packet in the area 823. The TX 101 also stores in the memory 210 a reading pointer indicating the sequential number of the last byte that has been read from the beginning of the attribute value. Consequently, the TX 101 can read one Qi packet that has not yet been read among the Qi packets stored in the areas 822 and 823, the areas 824 and 825, and the areas 826 and 827.

Next, the TX 101 processes the read one Qi packet (step S704). For example, if the TX 101 reads a Qi packet of which the header indicates 03, the TX 101 recognizes the Qi packet as a CE packet. Then, the TX 101 performs the process of changing the transmission power according to the control error value included in the message of the Qi packet. If the read Qi packet is an EPT packet, the TX 101 stops the transmission of power. The TX 101 also performs a process defined in advance by the WPC standard on another Qi packet.

Next, the TX 101 determines whether the reading of all the Qi packets included in the BLE packet is completed (step S705). The determination can be made based on whether the reading pointer has proceeded to the end of the attribute value. If the reading of all the Qi packets is not completed (NO in step S705), the processing returns to step S703. In step S703, the TX 101 performs the process of reading a Qi packet that has not yet been read, and if the reading of all the Qi packets is completed (YES in step S705), the processing ends. The TX 101 reads the Qi packets included in the BLE packet in order from the beginning and repeatedly processes the Qi packets. Specifically, when the TX 101 receives the BLE packet 810 in FIG. 8, first, the TX 101 reads a Qi packet 1 (823) at the beginning and then processes the Qi packet 1 (823), then, the TX 101 reads a Qi packet 2 (825) and then processes the Qi packet 2 (825). Finally, the TX 101 reads a Qi packet 3 (827) and then processes the Qi packet 3 (827). If the BLE packet 810 includes both a Qi packet for the real-time control and a Qi packet other than that for the real-time control, the TX 101 may process the Qi packet for the real-time control first. Specifically, if the one Qi packet read in step S703 is a Qi packet not for the real-time control, the TX 101 may perform the following process on the Qi packet not for the real-time control instead of processing the Qi packet not for the real-time control in step S704. That is, the TX 101 may hold the contents of the Qi packet not for the real-time control in the memory 210, and after the reading of all the Qi packets is completed (after YES in step S705), the TX 101 may process the held contents of the Qi packet not for the real-time control. Consequently, it is possible to shorten the time from when the BLE packet is received in step S701 to when the packet for the real-time control is processed in step S704. Thus, it is possible to control the transmission power almost in real time.

Based on the above, the reception process at the single connection interval by the TX 101 ends. The TX 101 repeats the above process at each connection interval during the period when a BLE connection is made.

Operation of System

The operation of the system including the TX 101 and the RX 102 is described with reference to FIGS. 4 to 7 and 9. A subsequent operation is described on the assumption that the RX 102 is placed on the charging stand 103 of the TX 101. In the present exemplary embodiment, the timing constraints in the real-time control of the transmission power that should be followed by the TX 101 and the RX 102 are as follows. That is, based on the WPC standard, t_interval=250 milliseconds, t_delay=5 milliseconds, t_control=25 milliseconds, and t_timeout=1500 milliseconds.

First, the TX 101 and the RX 102 execute processes up to the I & C phase (steps F901, steps S401 and S402, and steps S501 and S502). The RX 102 transmits ADV_IND including identification information (step F902), And the TX 101 confirms that this ADV_IND includes identification information regarding the RX 102 acquired in the I & C phase (step F903). Next, the TX 101 transmits CONNECT_IND and establishes a BLE connection between the TX 101 and the RX 102 (step F904, step S404, and step S504). Next, the RX 102 requests the TX 101 to set t_interval=250 milliseconds, which is the interval at which a CE packet is to be transmitted by the real-time control to be performed after this, as the connection interval in BLE (step F906 and step S505). Then, the TX 101 sets t_interval=250 milliseconds (step F907 and step S405). Then, the TX 101 and the RX 102 perform processes in the negotiation phase and the calibration phase in the WPC standard (step F908, steps S406 and S407, and steps S506 and S507) and transition to the power transfer phase.

At the first connection interval of 250 milliseconds, the RX 102 generates one CE packet as a Qi packet for the real-time control and stores the one CE packet in a BLE packet (step F909 and step S601). Since a Qi packet not for the real-time control that should be generated is absent (step S602 and YES in step S603), the RX 102 transmits the BLE packet including only the one CE packet (step F910 and step S604). The transmission of the BLE packet is performed by a notify process as described above. Also at the next connection interval, similarly, the RX 102 generates a BLE packet including only one CE packet (step F911, step S601 and S602, and YES in step S603) and transmits the BLE packet (step F912 and step S604). At the next connection interval, first, the RX 102 generates one CE packet and stores the one CE packet in a BLE packet (step F913 and step S601).

Next, the RX 102 generates one charge status packet as a Qi packet not for the real-time control and adds the one charge status packet to the BLE packet (step F914 and step S602). Since a further Qi packet not for the real-time control that should be generated is absent (YES in step S603), the RX 102 transmits the BLE packet including the one CE packet and the one charge status packet (step F915 and step S604).

At the subsequent connection interval, the RX 102 generates a BLE packet including only one CE packet (step F916, steps S601 and S602, and YES in step S603) and transmits the BLE packet (step F917 and step S604). At connection intervals after that, the RX 102 repeats a process similar to that at the connection interval in steps F916 and F917.

Then, at a certain connection interval, the RX 102 detects that the battery 302 has reached full charge (step F918). In this case, at the certain connection interval, the RX 102 generates one CE packet and stores the one CE packet in a BLE packet (step F919 and step S601). Then, the RX 102 generates one EPT packet not for the real-time control and adds the one EPT packet to the BLE packet (step F920 and step S602). Since a further Qi packet not for the real-time control that should be generated is absent (YES in step S603), the RX 102 transmits the BLE packet including the one CE packet and the one EPT packet (step F921 and step S604). As described with reference to FIG. 10C, when the RX 102 transmits the EPT packet, the power transfer phase ends. Since the TX 101 and the RX 102 are performing the out-of-band communication using BLE, the out-of-band communication is disconnected to end the process (step F922, YES in step S409, step S410, YES in S509, and step S510).

If the battery 302 reaches full charge (step F918), the RX 102 may not generate a CE packet, and may not store a CE packet in a BLE packet. A Qi packet stored in the BLE packet is only an EPT packet. If the battery 302 reaches full charge (step F918), the RX 102 may not transmit a BLE packet. Even with these configurations, a next CE packet is not received by the TX 101, and therefore, a timeout occurs, and the transmission of power is stopped.

The processing by the TX 101 in the power transfer phase is described. First, a description is given of the processing by the TX 101 in a case where the TX 101 receives a BLE packet including only one CE packet as in step F910 or F912. The TX 101 recognizes that the BLE packet received at the connection interval includes one Qi packet (steps S701 and S702). Then, the TX 101 reads the one Qi packet, i.e., the CE packet, from the BLE packet (step S703) and processes the one Qi packet (step S704). This process is the process of controlling the transmission power based on the control error value included in the CE packet. Then, since the reading of all the Qi packets is completed, the processing at the connection interval ends (YES in step S705).

Next, a description is given of the processing of the TX 101 in a case where the TX 101 receives a BLE packet including one CE packet and a charge status packet as another Qi packet as in step F915. The TX 101 recognizes that the BLE packet received at the connection interval includes two Qi packets (steps S701 and S702). Then, the TX 101 reads the one Qi packet at the beginning, i.e., the CE packet, from the BLE packet (step S703) and processes the one Qi packet (step S704). This process is the process of controlling the transmission power based on the control error value included in the CE packet. Then, since the reading of all the Qi packets is not completed, the processing returns to step S703 (NO in step S705). Next, the TX 101 reads the charge status packet (step S703) and processes the charge status packet (step S704). This process is the process of performing display on the display unit 208 based on the charge status value included in the charge status packet. Then, since the reading of all the Qi packets is completed, the processing at this connection interval ends (YES in step S705).

Based on the above, over the entire period of step F930 in the power transfer phase, the TX 101 can periodically receive one CE packet at each time interval of 250 milliseconds, which is the same as the connection interval in BLE, and process the one CE packet. In step F906, the RX 102 sets the connection interval to the same interval as t_interval, which is the expected transmission interval of the CE packet. That is, the TX 101 and the RX 102 repeat the real-time control of the transmission power described with reference to FIG. 11 at t_interval=250 milliseconds determined in advance by the RX 102, through the use of the out-of-band communication using BLE. Since a BLE packet including a CE packet arrives every 250 milliseconds, a timeout does not occur by the interval between CE packets becoming longer than t_timeout=1500 milliseconds. Further, a BLE packet transmitted in a cycle of 250 milliseconds from the RX 102 includes up to only one CE packet based on step S601 in FIG. 6. Thus, after the transmission of the CE packet, the RX 102 does not transmit a next CE packet within t_delay+t_control=30 milliseconds in FIG. 11, either. Thus, according to the procedure of the present disclosure, it is possible to perform the real-time control of the transmission power according to timings determined in advance between the TX 101 and the RX 102. During the period of step F930, the TX 101 can also perform the real-time control using a CE packet while receiving and processing a Qi packet not for the real-time control such as a charge status packet.

Although a description has been given of an example of the real-time control of the transmission power using a CE packet in the above exemplary embodiment, the present disclosure is also applicable to the real-time control using a packet other than a CE packet. For example, the present disclosure may be applied to the real-time control using a received power packet (hereinafter referred to as an "RP packet") described below. That is, an RP packet is a real-time control packet. In the power transfer phase, the RX 102 repeatedly transmits an RP packet. Each RP packet includes information regarding the reception power of the RX 102 at the time. The transmission interval is defined by the WPC standard and is 1500 milliseconds, for example. The TX 101 periodically receives an RP packet, and thus, if the difference between the magnitude of the reception power and the magnitude of the transmission power is greater than or equal to a predetermined value and a foreign object enters between the TX 101 and the RX 102, the TX 101 can detect the foreign object in real time. In a case where only the real-time control using an RP packet is performed, the connection interval may be set to 1500 milliseconds. The control unit 301 also limits the maximum number of RP packets to be stored in a BLE packet to one.

In a case where both the real-time control using a CE packet and the real-time control using an RP packet are performed, the following process may be performed. That is, the connection interval is set to 250 milliseconds, and a CE packet is transmitted at each connection interval. Then, since 1500/250=6, an RP packet may be transmitted at every six connection intervals. At this time, the RX 102 generates up to one CE packet and one RP packet in step S601 in FIG. 6. Consequently, it is possible to simultaneously perform the real-time control using a CE packet and the real-time control using an RP packet.

In the present exemplary embodiment, a configuration has been described in which one BLE packet includes only one CE packet and one RP packet used in the real-time control. However, a similar effect is obtained also with a configuration in which one BLE packet includes either one of a CE packet and an RP packet. This is because, as already described, in a case where a plurality of pieces of data used in the real-time control is present in one BLE packet, the real-time control using either a CE packet or an RP packet may be undermined.

In a case where the RX 102 transmits a Qi packet for the real-time control and a Qi packet not for the real-time control using one BLE packet, the RX 102 may store the Qi packet for the real-time control at the beginning of the BLE packet. Specifically, the RX 102 may store the Qi packet for the real-time control in the Qi packet 1 (823) at the beginning of the BLE packet in FIG. 8 and store the Qi packet not for the real-time control in the Qi packet 2 (825) or a subsequent Qi packet. In this manner, even in a case where the TX 101 processes the Qi packets included in the BLE packet in order from the beginning, it is possible to avoid the risk that it takes time to process the Qi packet for the real-time control and the real-time control cannot be performed.

In a case where the RX 102 sends a Qi packet for the real-time control using one BLE packet, the RX 102 may not add any other Qi packet to the BLE packet. Specifically, in a case where the RX 102 stores a Qi packet for the real-time control in the Qi packet 1 (823) in FIG. 8, the RX 102 transmits a BLE packet that does not store any other Qi packet in the attribute value (811). A similar effect can be obtained also with this configuration.

In a case where a plurality of Qi packets for the real-time control is present in one BLE packet, the TX 101 may not process the Qi packets for the real-time control, or may stop the transmission of power. This is because, in such a case, there is a risk that the real-time control cannot be performed and a failure occurs in the system. This can avoid a risk such as a breakdown of the TX 101 or the RX 102.

Second Exemplary Embodiment

Figure 12:
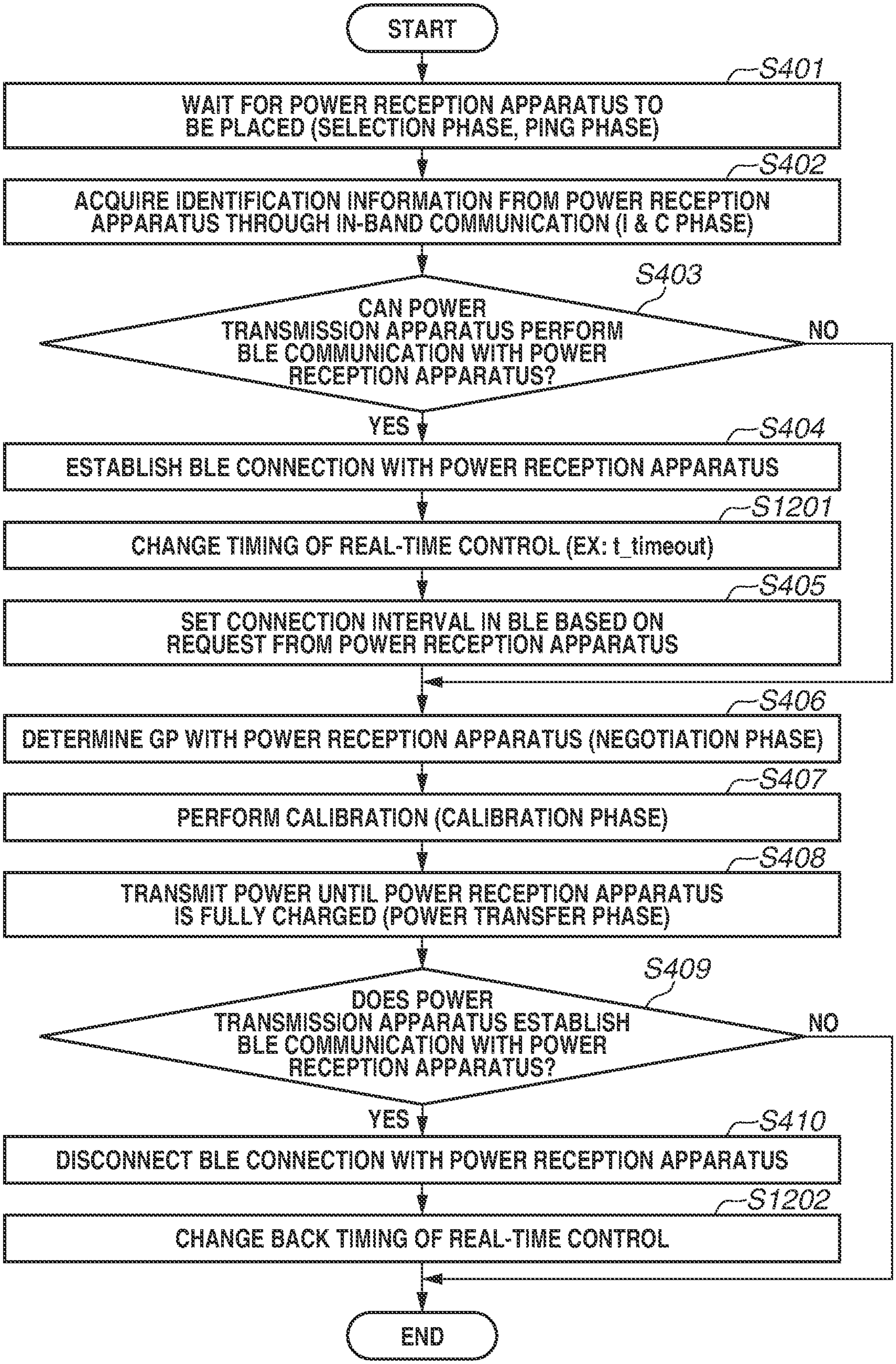
FIG. 12 is a flowchart of a process performed by the power transmission apparatus according to a second exemplary embodiment.

In the present exemplary embodiment, in a case where the out-of-band communication is performed, a timing related to the real-time control of the transmission power is changed to a value different from that in a case where the in-band communication is performed. The timing refers to, for example, t_interval or t_timeout described in the first exemplary embodiment. FIG. 12 is a diagram illustrating the flow of the processing of the TX 101 according to the second exemplary embodiment. The second exemplary embodiment is different from the first exemplary embodiment described with reference to FIG. 4 in the following respects. That is, the process of, in a case where the TX 101 can perform the BLE communication with the RX 102, changing the timing of the real-time control (step S1201), and the process of, after the BLE communication ends, changing the timing of the real-time control back to the state before the change (step S1202) are added. In the present exemplary embodiment, the TX 101 holds, in the memory 210, timing information in a case where the real-time control is performed through the in-band communication and timing information in a case where the real-time control is performed through the out-of-band communication. In a case where the out-of-band communication is performed, the real-time control is performed using the latter timing information.

Figure 13:
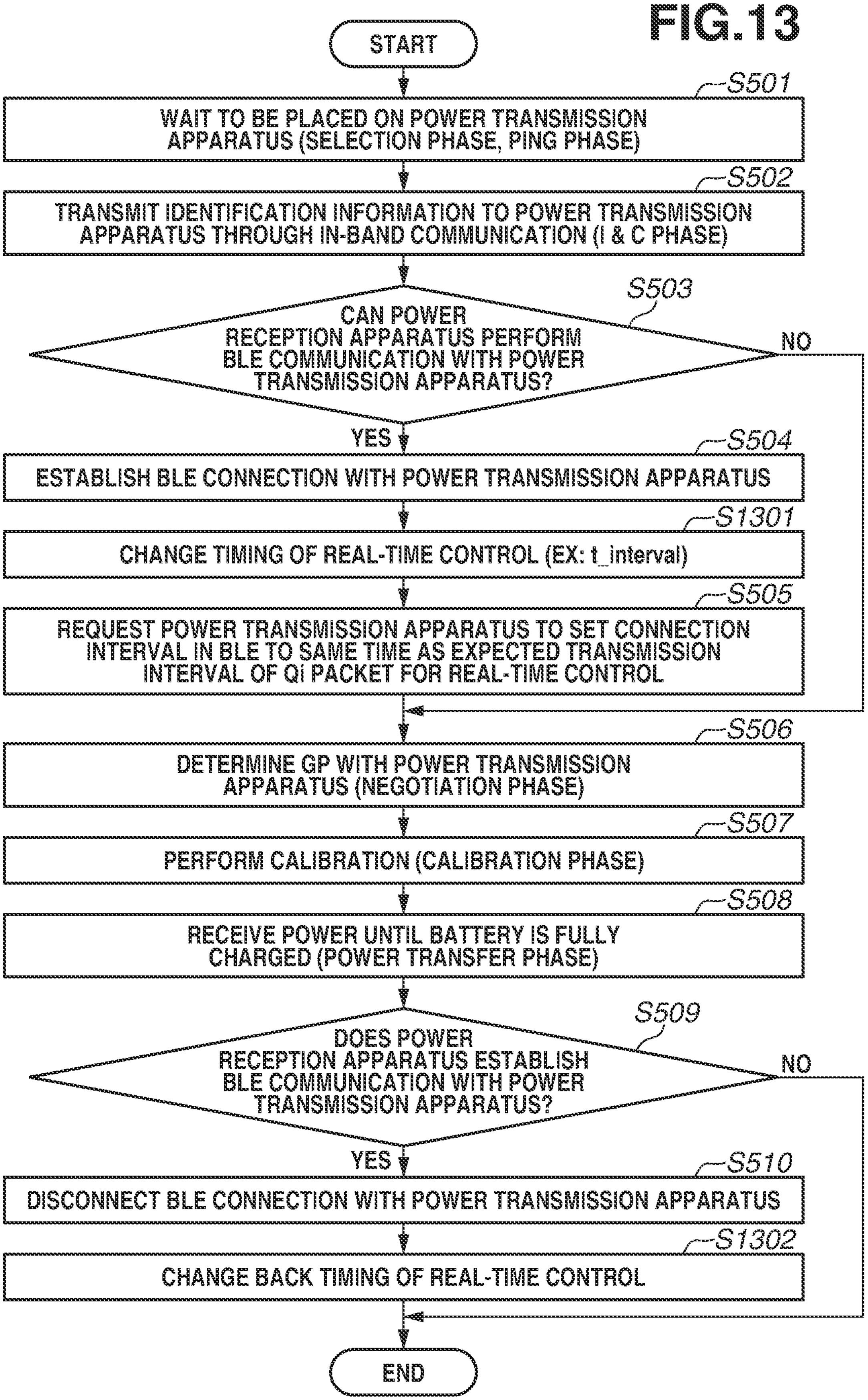
FIG. 13 is a flowchart of a process performed by the power reception apparatus according to the second exemplary embodiment.

The same applies to the RX 102. FIG. 13 is a diagram illustrating the flow of the processing of the RX 102 according to the second exemplary embodiment. The second exemplary embodiment is different from the first exemplary embodiment described with reference to FIG. 5 in the following respects. That is, the process of, in a case where the RX 102 can perform the BLE communication with the TX 101, changing the timing of the real-time control (step S1301), and the process of, after the BLE communication ends, changing the timing of the real-time control back to the state before the change (step S1302) are added. In the present exemplary embodiment, the RX 102 holds, in the memory 310, timing information in a case where the real-time control is performed through the in-band communication and timing information in a case where the real-time control is performed through the out-of-band communication. In a case where the out-of-band communication is performed, the real-time control is performed using the latter timing information.

After the process of step S404 illustrated in FIG. 4, the TX 101 according to the present exemplary embodiment changes the timing of the real-time control (step S1201). Specifically, the TX 101 changes the timing of the real-time control based on the timing information held in the memory 210 and regarding the real-time control in a case where the out-of-band communication is performed. The TX 101 and the RX 102 set the timing of the real-time control in a case where the out-of-band communication is performed to a value shorter than that in a case where the in-band communication is performed. For example, t_interval in a case where the in-band communication is performed is set to 250 milliseconds, and t_timeout in this case is set to 1500 milliseconds. On the other hand, t_interval in a case where the out-of-band communication is performed is set to 100 milliseconds, and t_timeout in this case is set to 500 milliseconds.

Then, after the process of step S410 illustrated in FIG. 4, the TX 101 changes the timing of the real-time control back to the previous value (step S1202). Specifically, the TX 101 changes the timing of the real-time control based on the timing information held in the memory 210 and regarding the real-time control in a case where the in-band communication is performed.

Figure 5:
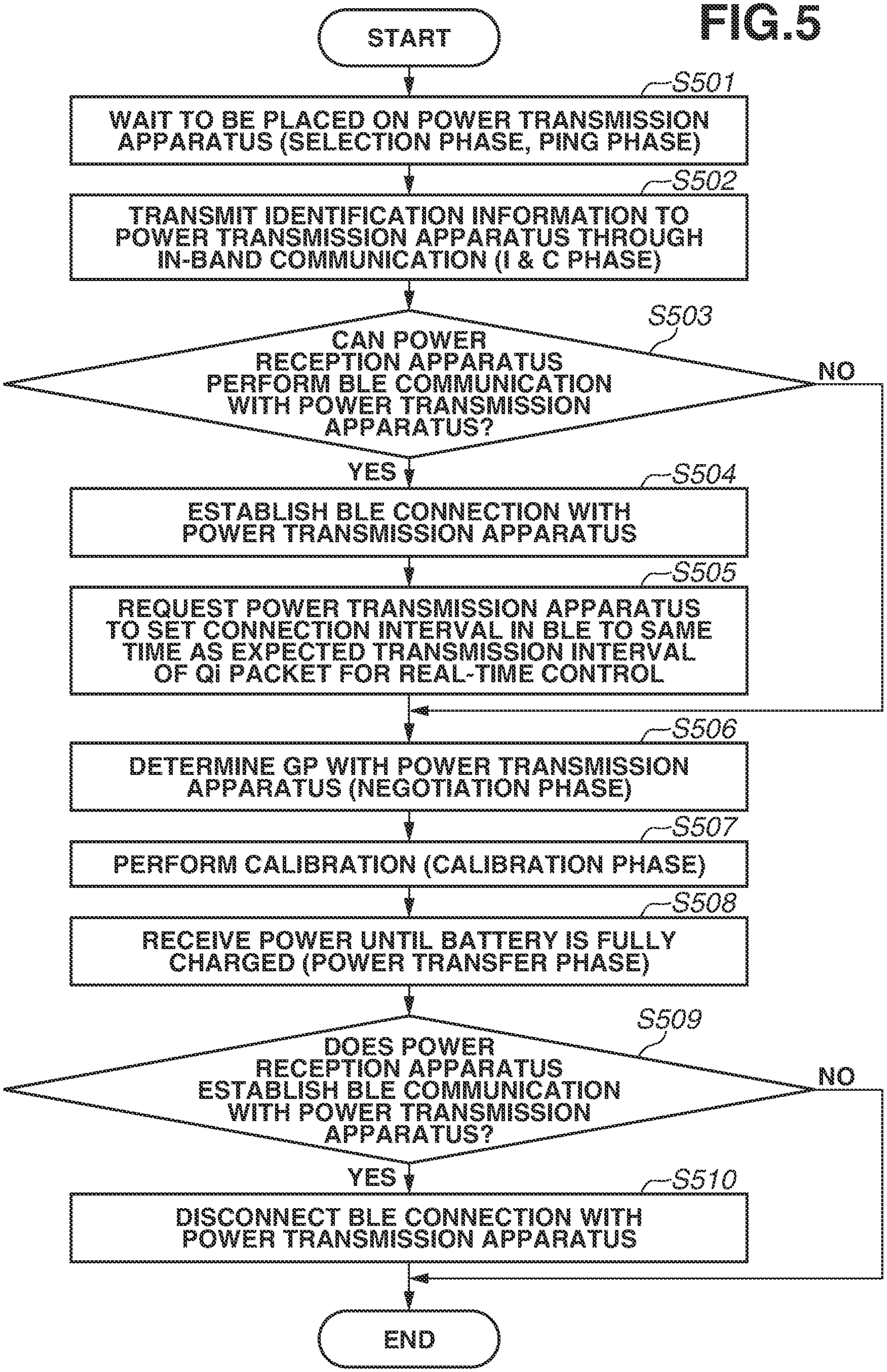
FIG. 5 is a flowchart of a process performed by the power reception apparatus according to the first exemplary embodiment.

After the process of step S504 illustrated in FIG. 5, the RX 102 changes the timing of the real-time control (step S1301). Specifically, the RX 102 changes the timing of the real-time control based on the timing information held in the memory 310 and regarding the real-time control in a case where the out-of-band communication is performed. Then, after the process of step S510 illustrated in FIG. 5, the RX 102 changes the timing of the real-time control back to the previous value (step S1302). Specifically, the RX 102 changes the timing of the real-time control based on the timing information held in the memory 310 and regarding the real-time control in a case where the in-band communication is performed.

With the above configuration, in a case where high-speed communication can be performed through the out-of-band communication, the control cycle is shortened by shortening the timing of the real-time control of the transmission power, whereby it is possible to perform control with more excellent responsiveness. A change in the timing is applied to only the period from the start to the end of the out-of-band communication. Thus, in a case where the real-time control is performed using the in-band communication, the real-time control can be performed in a conventional manner. Consequently, it is possible to ensure the backward compatibility of the TX 101 or the RX 102 that does not have the out-of-band communication function.

The timing information that applies different values between the out-of-band communication and the in-band communication may be timing information other than t_interval or t_timeout. Further, a timing other than that of the real-time control of the transmission power may be changed. For example, the entire timeout time from the start to the end of the calibration phase may be set to 10 seconds in the case of the in-band communication and set to 5 seconds in the case of the out-of-band communication. The same applies to the negotiation phase and the other phases. Consequently, in a case where high-speed communication can be performed through the out-of-band communication, it is possible to hasten the determination of a timeout, and for example, notify the user of an error early.

Other Exemplary Embodiments

The present disclosure can also be achieved by the process of supplying a program for achieving one or more functions of the above exemplary embodiments to a system or an apparatus via a network or a storage medium, and of causing one or more processors of a computer of the system or the apparatus to read and execute the program. The present disclosure can also be achieved by a circuit (e.g., an ASIC) for achieving the one or more functions.

Alternatively, each of the power transmission apparatus 101 and the power reception apparatus 102 may be an image input apparatus such as an imaging apparatus (a camera or a video camera) or a scanner, or may be an image output apparatus such as a printer, a copying machine, or a projector. Yet alternatively, each of the power transmission apparatus 101 and the power reception apparatus 102 may be a storage device such as a hard disk device or a memory device, or may be an information processing apparatus such as a personal computer (PC) or a smartphone.

Alternatively, at least a part of the flowcharts illustrated in FIGS. 4 to 7 may be achieved by hardware. In a case where at least a part of the flowchart is achieved by hardware, for example, a dedicated circuit may be automatically generated on an FPGA using a predetermined compiler according to a program for achieving steps. Yet alternatively, a gate array circuit may be formed similarly to the FPGA, and at least a part of the flowchart may be achieved as hardware.

Alternatively, for example, in a case where two or more CE packets used in the real-time control are present in one BLE packet, the power transmission apparatus may ignore one of the CE packets. In this case, the power transmission apparatus can control the transmission power based on the first CE packet. Consequently, the power transmission apparatus can control the transmission power earlier. The power transmission apparatus may also control the transmission power based on the last CE packet. Consequently, it is possible to adjust the transmission power to the power requested last by the power reception apparatus.

Alternatively, the power reception apparatus according to the present disclosure may be an information terminal device. For example, the information terminal device includes a display unit (a display) to which power received from a power reception antenna is supplied and which displays information to the user. The power received from the power reception antenna is stored in a power storage unit (a battery), and the battery supplies the power to the display unit. In this case, the power reception apparatus may include a communication unit that communicates with another apparatus different from the power transmission apparatus. The communication unit may be compatible with a communication standard such as NFC communication or the fifth generation mobile communication system (5G).

Yet alternatively, the power reception apparatus according to the present disclosure may be a vehicle such as an automobile. For example, the automobile as the power reception apparatus may receive power from a charger (the power transmission apparatus) via a power transmission antenna installed in a parking lot. Alternatively, the automobile as the power reception apparatus may receive power from a charger (the power transmission apparatus) via a power transmission antenna embedded in a road. Power received by such an automobile is supplied to a battery. The power in the battery may be supplied to a motor unit (a motor or an electric-powered unit) that drives wheels, or may be used to drive a sensor used in driving assistance or drive a communication unit that communicates with an external apparatus. That is, in this case, the power reception apparatus may include the wheels, the battery, the motor or the sensor driven using received power, and further, a communication unit that communicates with an apparatus other than the power transmission apparatus. Further, the power reception apparatus may include an accommodation unit that accommodates a person. Examples of the sensor include a sensor used to measure the distance between vehicles or the distance from another obstacle. For example, the communication unit may be compatible with the Global Positioning System (Global Positioning Satellite, GPS). The communication unit may also be compatible with a communication standard such as the fifth generation mobile communication system (5G). Alternatively, the vehicle may be a bicycle or a motorcycle.

Yet alternatively, the power reception apparatus according to the present disclosure may be a power tool or a household electrical appliance product. Each of these devices as the power reception apparatus may include a battery and a motor driven by reception power stored in the battery. Each of these devices may also include a notification unit that gives a notification of the remaining amount of the battery. Each of these devices may also include a communication unit that communicates with another apparatus different from the power transmission apparatus. The communication unit may be compatible with a communication standard such as NFC or the fifth generation mobile communication system (5G).

Alternatively, the power transmission apparatus according to the present disclosure may be an in-vehicle charger that transmits power to a mobile information terminal device, such as a smartphone or a tablet compatible with wireless power transmission, inside an automobile. Such an in-vehicle charger may be provided anywhere in the automobile. For example, the in-vehicle charger may be installed in the console of the automobile, or may be installed in the instrument panel (the instrument panel or the dashboard), at a position between seats for passengers, on the ceiling, or on a door. The in-vehicle charger, however, should not be installed at a location where the in-vehicle charger interferes with driving. Although an example has been described where the power transmission apparatus is an in-vehicle charger, such a charger is not limited to a charger placed in a vehicle, and may be installed in a transport vehicle such as a train, an aircraft, or a vessel. The charger in this case may also be installed at a position between seats for passengers, on the ceiling, or on a door.

Alternatively, a vehicle such as an automobile including an in-vehicle charger may be the power transmission apparatus. In this case, the power transmission apparatus includes wheels and a battery and supplies power to the power reception apparatus via a power transmission circuit unit and a power transmission antenna using power in the battery.

The present disclosure is not limited to the above exemplary embodiments, and can be changed and modified in various ways without departing from the spirit and the scope of the present disclosure. Thus, the following claims are appended to publicize the scope of the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, in a case where communication for controlling of wireless power transmission is performed using an antenna different from an antenna used in the wireless power transmission, it is possible to appropriately control the wireless power transmission.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A power reception apparatus comprising:

a power reception unit configured to wirelessly receive power from a power transmission apparatus via a first antenna;

a communication unit configured to communicate with the power transmission apparatus via a second antenna, using a communication packet capable of storing a plurality of control packets that controls wireless power transmission; and a limitation unit configured to limit the number of control packets of a specific type to be stored in the communication packet to one or less and configured not to limit the number of control packets of a type different from the specific type to be stored in the communication packet to one or less.

2. The power reception apparatus according to claim 1, wherein the communication unit intermittently performs communication.

3. The power reception apparatus according to claim 1, wherein the communication unit performs communication according to Bluetooth (registered trademark) Low Energy (BLE) defined by a Bluetooth (registered trademark) 4.0 standard or later.

4. The power reception apparatus according to claim 3, wherein each of the control packets is a packet defined by a Wireless Power Consortium (WPC) standard, and wherein a packet defined by the WPC standard is stored in an attribute value of the communication packet used in the communication according to BLE.

5. The power reception apparatus according to claim 1, wherein each of the control packets is a packet defined by a Wireless Power Consortium (WPC) standard, and wherein a control packet of the specific type is a control error packet defined by the WPC standard.

6. The power reception apparatus according to claim 1, wherein each of the control packets is a packet defined by a WPC standard, and wherein a control packet of the specific type is a received power packet defined by the WPC standard.

7. The power reception apparatus according to claim 1, wherein each of the control packets is a packet defined by a WPC standard, and wherein each of a control error packet defined by the WPC standard and a received power packet defined by the WPC standard is a control packet of the specific type.

8. The power reception apparatus according to claim 7, wherein the communication packet includes one control error packet and one received power packet.

9. The power reception apparatus according to claim 1, further comprising:

a battery configured to store power received by the power reception unit; and a motor configured to drive a wheel using the power in the battery.

10. The power reception apparatus according to claim 1, further comprising:

a battery configured to store power received by the power reception unit; and a display unit to which the power in the battery is supplied.

11. The power reception apparatus according to claim 1, further comprising:

a battery configured to store power received by the power reception unit; and a notification unit configured to give a notification of a remaining amount of the battery.

* * * * *